(12) United States Patent
Yonemura et al.

(10) Patent No.: US 10,541,390 B2
(45) Date of Patent: Jan. 21, 2020

(54) POWER STORAGE UNIT AND ELECTRONIC DEVICE

(71) Applicant: SEMICONDUCTOR ENERGY LABORATORY CO., LTD., Atsugi-shi, Kanagawa-ken (JP)

(72) Inventors: Hitoshi Yonemura, Kanagawa (JP); Minoru Takahashi, Nagano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 656 days.

(21) Appl. No.: 15/153,768

(22) Filed: May 13, 2016

(65) Prior Publication Data
US 2016/0343999 A1    Nov. 24, 2016

(30) Foreign Application Priority Data
May 18, 2015    (JP) ................. 2015-101318

(51) Int. Cl.
*H01M 2/02*    (2006.01)
*H01G 11/26*    (2013.01)
(Continued)

(52) U.S. Cl.
CPC ........ *H01M 2/0275* (2013.01); *G06F 1/1635* (2013.01); *H01G 11/26* (2013.01);
(Continued)

(58) Field of Classification Search
CPC .. H01M 2/0275; H01M 2/021; H01M 2/0217; H01M 2/0287; H01M 2/06;
(Continued)

(56) References Cited

U.S. PATENT DOCUMENTS

| 6,145,280 A | 11/2000 | Daroux et al. |
| 8,785,030 B2 | 7/2014 | Ueda |

(Continued)

FOREIGN PATENT DOCUMENTS

| JP | 2000-173559 | 6/2000 |
| JP | 2001-332752 A | 11/2001 |

(Continued)

OTHER PUBLICATIONS

Sundaram.R et al., "Electrochemical Modification of Graphene", Adv. Mater. (Advanced Materials), Jul. 7, 2008, vol. 20, No. 16, pp. 3050-3053.

(Continued)

*Primary Examiner* — Jonathan G Jelsma
*Assistant Examiner* — Omar M Kekia
(74) *Attorney, Agent, or Firm* — Nixon Peabody LLP; Jessica L. Costellia

(57) ABSTRACT

A flexible power storage unit is obtained. Projections whose ridgelines extend in a first direction are provided on the front and the back of the power storage unit and depressions whose valley lines extend in a second direction are provided on the sides of the power storage unit. The projections and depressions are provided such that the ridgelines of the projections or extended lines of the ridgelines intersect with the valley lines of the depressions or extended lines of the valley lines.

23 Claims, 33 Drawing Sheets

(51) Int. Cl.
*H01G 11/78* (2013.01)
*H02J 7/00* (2006.01)
*G06F 1/16* (2006.01)
*H01G 11/50* (2013.01)
*H02J 7/34* (2006.01)
*H01M 10/04* (2006.01)
*H01M 2/06* (2006.01)

(52) U.S. Cl.
CPC ............ *H01G 11/78* (2013.01); *H02J 7/0052* (2013.01); *H02J 7/0072* (2013.01); *H01G 11/50* (2013.01); *H01M 2/021* (2013.01); *H01M 2/0217* (2013.01); *H01M 2/0287* (2013.01); *H01M 2/06* (2013.01); *H01M 10/0436* (2013.01); *H01M 10/0459* (2013.01); *H01M 10/0468* (2013.01); *H01M 2002/0205* (2013.01); *H01M 2220/30* (2013.01); *H02J 7/345* (2013.01); *Y02E 60/13* (2013.01); *Y02T 10/7022* (2013.01)

(58) Field of Classification Search
CPC ......... H01M 10/0436; H01M 10/0459; H01M 10/0468; H01M 2002/0205; H01M 2220/30; H01G 11/26; H01G 11/78; H01G 11/50; H02J 7/0052; H02J 7/0072; H02J 7/345; G06F 1/1635; B60L 11/1811; Y02E 60/13; Y02T 10/7022
USPC ........................................................ 429/127
See application file for complete search history.

(56) References Cited

U.S. PATENT DOCUMENTS

| | | |
|---|---|---|
| 2010/0081049 A1 | 4/2010 | Hoiik et al. |
| 2010/0081057 A1 | 4/2010 | Liu et al. |
| 2010/0301279 A1 | 12/2010 | Nesper et al. |
| 2010/0303706 A1 | 12/2010 | Wallace et al. |
| 2011/0121240 A1 | 5/2011 | Amine et al. |
| 2011/0227000 A1 | 9/2011 | Ruoff et al. |
| 2011/0262785 A1 | 10/2011 | Johnson et al. |
| 2011/0294009 A1 | 12/2011 | Kawakami et al. |
| 2013/0101884 A1 | 4/2013 | Ueda |
| 2013/0134051 A1 | 5/2013 | Takahashi et al. |
| 2013/0171490 A1 | 7/2013 | Rothkopf et al. |
| 2013/0196214 A1 | 8/2013 | Scott et al. |
| 2013/0224562 A1 | 8/2013 | Momo |
| 2014/0063719 A1 | 3/2014 | Yamazaki et al. |
| 2015/0022957 A1 | 1/2015 | Hiroki et al. |
| 2015/0155528 A1 | 6/2015 | Takahashi et al. |

FOREIGN PATENT DOCUMENTS

| | | | |
|---|---|---|---|
| JP | 2007-123081 A | 5/2007 | |
| JP | 2011-500488 | 1/2011 | |
| JP | 2012-009418 A | 1/2012 | |
| WO | WO 2013/101316 | * 7/2013 | ........ H01M 10/0436 |

OTHER PUBLICATIONS

Zhou.M et al., "Controlled Synthesis of Large-Area and Patterned Electrochemically Reduced Graphene Oxide Films", Chemistry A European Journal, May 14, 2009, vol. 15, No. 25, pp. 6116-6120.

Shao.Y et al., "Facile and controllable electrochemical reduction of graphene oxide and its applications", J. Mater. Chem. (Journal of Materials Chemistry), 2010, vol. 20, No. 4, pp. 743-748.

* cited by examiner

------- Ridgeline
—·—·— Vallay Line

------- Ridgeline
—·—·— Vallay Line

------- Ridgeline
------- Valley Line

------- Ridgeline
——·—— Valley Line

------- Ridgeline
——·—— Vallay Line

POWER STORAGE UNIT AND ELECTRONIC DEVICE

BACKGROUND OF THE INVENTION

1. Field of the Invention

One embodiment of the present invention relates to a power storage unit and a manufacturing method thereof.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter.

Note that in this specification, the power storage unit is a collective term describing units and devices having a power storage function. Examples of the power storage unit include a battery, a primary battery, a secondary battery, a lithium-ion secondary battery, a lithium-air secondary battery, a capacitor, and a lithium-ion capacitor. Also in this specification, the electrochemical device is a collective term describing devices that can function using a power storage unit, a conductive layer, a resistor, a capacitor, and the like. In addition, an electronic device, an electric appliance, a mechanical device, and the like each include a power storage unit according to one embodiment of the present invention in some cases.

In this specification and the like, a semiconductor device generally means a device that can function by utilizing semiconductor characteristics. A display device (e.g., a liquid crystal display device and a light-emitting display device), a lighting device, an electro-optical device, a power storage device, a memory device, a semiconductor circuit, an imaging device, an electronic device, and the like may include a semiconductor device.

2. Description of the Related Art

In recent years, a variety of power storage units, for example, secondary batteries such as lithium-ion secondary batteries, lithium-ion capacitors, and air batteries, have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

The performance required for the lithium-ion batteries includes increased energy density, improved cycle characteristics, safe operation under a variety of environments, and longer-term reliability.

Also in recent years, flexible display devices have been proposed to be mounted on a curved surface or worn on the human body such as head. This has increased demand for flexible power storage units that can be attached to a curved surface. For example, Patent Document 1 discloses a power storage unit whose flexibility is increased with a wave-shaped exterior body.

REFERENCE

Patent Document

[Patent Document 1] Japanese Published Patent Application No. 2000-173559

SUMMARY OF THE INVENTION

In Patent Document 1, a side surface (a crease 6) of an exterior body does not have a wave shape, or a wave shape of the side surface is pressed to be flattened. Because the side surface of such an exterior body prevents bending, it is difficult to increase flexibility of the power storage unit.

An object of one embodiment of the present invention is to provide a power storage unit or the like which has flexibility. Another object is to provide a power storage unit or the like which is easy to bend and stretch. Another object is to provide a power storage unit or the like which has excellent flexibility. Another object of one embodiment of the present invention is to provide a power storage unit or the like which is unlikely to be damaged. Another object of one embodiment of the present invention is to provide a power storage unit or the like in which a defect is unlikely to occur. Another object of one embodiment of the present invention is to provide a highly reliable power storage unit or the like. Still another object of one embodiment of the present invention is to provide a novel power storage unit or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a power storage unit including an exterior body, a positive electrode, a negative electrode, a separator, and an electrolyte solution. The positive electrode, the negative electrode, the separator, and the electrolyte solution are surrounded by the exterior body. The exterior body has a projection whose ridgeline extends in a first direction and a depression whose valley line extends in a second direction. The ridgeline or an extended line of the ridgeline intersects with the valley line or an extended line of the valley line. The ridgeline includes a region overlapping with the positive electrode, the negative electrode, and the separator in the second direction. The valley line includes a region overlapping with the positive electrode, the negative electrode, and the separator in the first direction.

Another embodiment of the present invention is a power storage unit including an exterior body, a positive electrode, a negative electrode, a separator, and an electrolyte solution. The positive electrode, the negative electrode, the separator, and the electrolyte solution are surrounded by the exterior body. The exterior body has a first ridgeline and a first valley line each extending in a first direction, and a second ridgeline and a second valley line each extending in a second direction. The first ridgeline or an extended line of the first ridgeline intersects with the second valley line or an extended line of the second valley line. The first valley line or an extended line of the first valley line intersects with the second ridgeline or an extended line of the second ridgeline.

The first ridgeline includes a region overlapping with the positive electrode, the negative electrode, and the separator in the second direction. The first valley line includes a region overlapping with the positive electrode, the negative electrode, and the separator in the second direction.

The second ridgeline includes a region overlapping with the positive electrode, the negative electrode, and the separator in the first direction. The second valley line includes a region overlapping with the positive electrode, the negative electrode, and the separator in the first direction.

The first direction is orthogonal to the second direction in some cases.

Another embodiment of the present invention is a power storage unit including an exterior body, a positive electrode, a negative electrode, a separator, and an electrolyte solution. The positive electrode, the negative electrode, the separator, and the electrolyte solution are surrounded by the exterior body. The exterior body has a first surface, a second surface, a third surface, and a fourth surface. The first surface has a first ridgeline extending in a first direction. The second surface has a first valley line extending in a second direction. The third surface has a second ridgeline extending in a third direction. The fourth surface has a second valley line extending in a fourth direction. The first ridgeline or an extended line of the first ridgeline and the second ridgeline or an extended line of the second ridgeline intersect with the first valley line or an extended line of the first valley line and the second valley line or an extended line of the second valley line.

The first ridgeline and the second ridgeline include regions overlapping with the positive electrode, the negative electrode, and the separator in the second direction and the fourth direction. The first valley line and the second valley line include regions overlapping with positive electrode, the negative electrode, and the separator in the first direction and the third direction. The first direction and the third direction are preferably same. The second direction and the fourth direction are preferably same.

At least one of the first direction and the third direction is orthogonal to at least one of the second direction and the fourth direction in some cases.

The exterior body can be a stack including a metal film and a thermoplastic film. The power storage unit of one embodiment of the present invention can be used for an electronic device. The power storage unit of one embodiment of the present invention can change in shape in accordance with a change in the shape of a housing of the electronic device.

A power storage unit or the like which has flexibility can be achieved. A power storage unit or the like which is easy to bend and stretch can be achieved. A power storage unit or the like which has excellent flexibility can be achieved. A power storage unit or the like which is less likely to be damaged can be provided. A highly reliable power storage unit or the like can be provided. A novel power storage unit or the like can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings.

DETAILED DESCRIPTION OF THE INVENTION

Figure 1A:
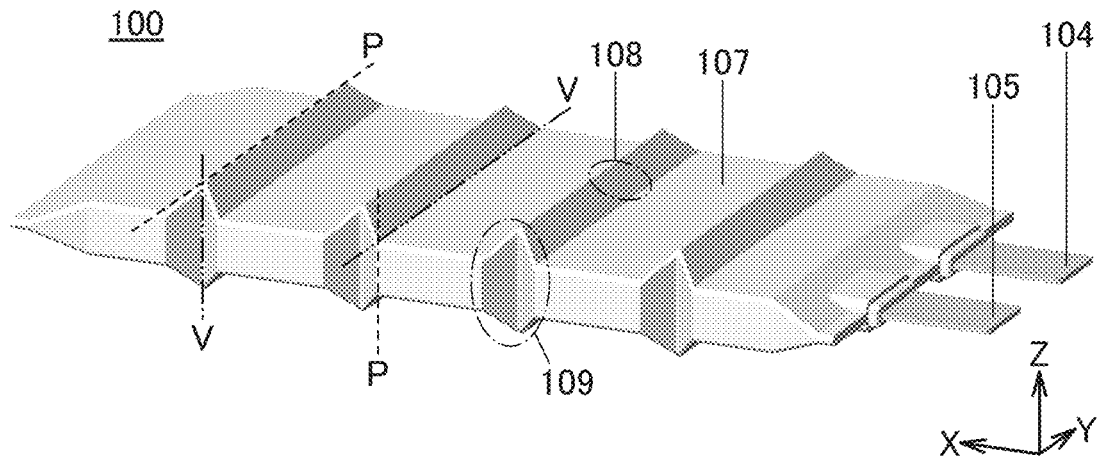
FIGS. 1A to 1C illustrate an example of a power storage unit.

Embodiments will be described in detail with reference to the drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated in some cases.

The position, size, range, and the like of each component illustrated in the drawings and the like are not accurately represented in some cases to facilitate understanding of the invention. Therefore, the present invention is not necessarily limited to the position, size, range, or the like disclosed in the drawings and the like.

Some components are not illustrated in drawings and the like in some cases for easy understanding. In addition, some hidden lines and the like might not be shown.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components. In addition, a term with an ordinal number in this specification and the like might be provided with a different ordinal number in a claim. Moreover, a term with an ordinal number in this specification and the like might not be provided with any ordinal number in a claim.

In this specification and the like, a term "parallel" indicates that, for example, the angle formed between two straight lines is greater than or equal to $-10°$ and less than or equal to $10°$, and accordingly also includes the case where the angle is greater than or equal to $-5°$ and less than or equal to $5°$. In addition, the term "substantially parallel" indicates that the angle formed between two straight lines is greater than or equal to $-30°$ and less than or equal to $30°$. Furthermore, the term "perpendicular" or "orthogonal" indicates that the angle formed between two straight lines is greater than or equal to $80°$ and less than or equal to $100°$, and accordingly also includes the case where the angle is greater than or equal to $85°$ and less than or equal to $95°$. A term "substantially perpendicular" or "substantially orthogonal" indicates that the angle formed between two straight lines is greater than or equal to $60°$ and less than or equal to $120°$.

In this specification and the like, the term "intersection" indicates the state where two straight lines overlap with each other at one point. Thus, the state where an end portion of one straight line overlaps with the other straight line is also the state of "intersection." Furthermore, the state where an end portion of one straight line overlaps with an end portion of the other straight line is also the state of "intersection."

In the specification and the like, the terms "identical," "the same," "equal," "uniform," and the like (including synonyms thereof) used in describing calculation values and actual measurement values allow for a margin of error of ±20% unless otherwise specified.

Embodiment 1

<Structure of Power Storage Unit>

Figure 1B:
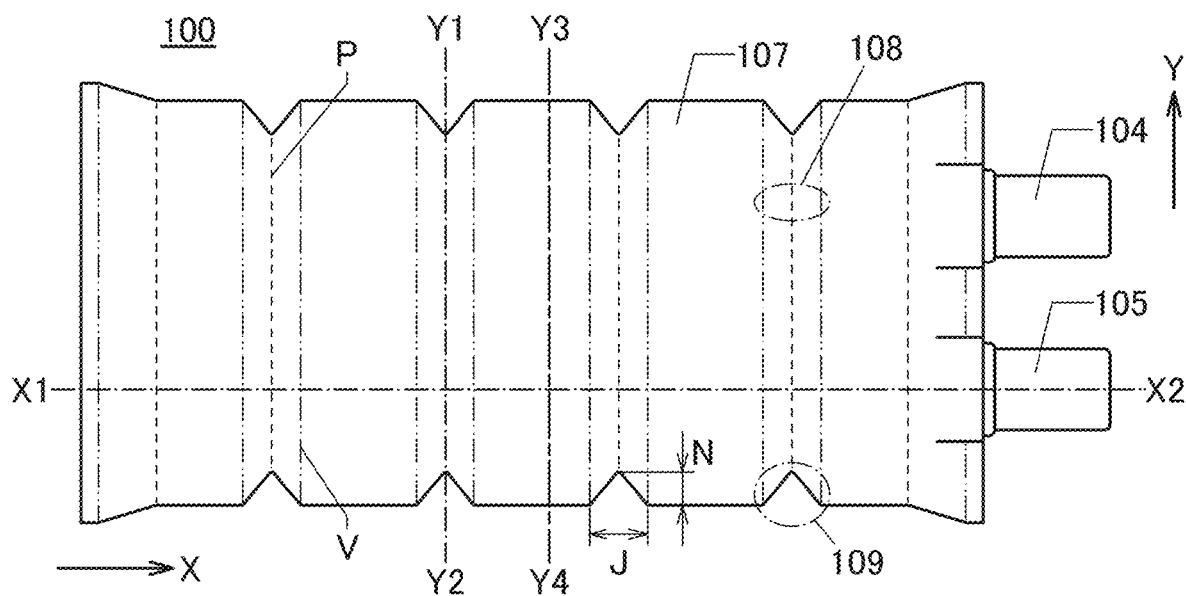
Figure 1C:
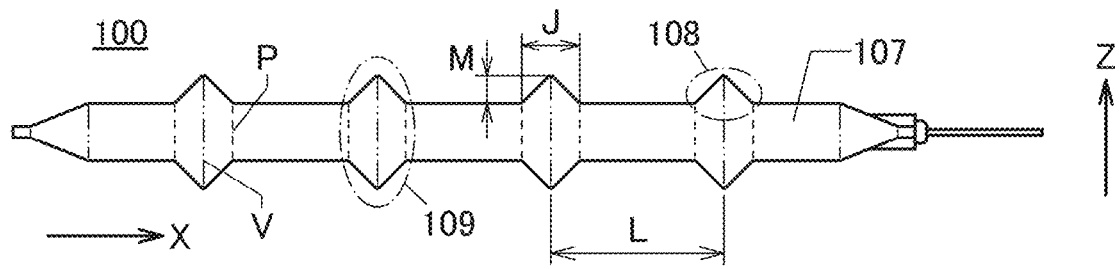

A structural example of a power storage unit 100 of one embodiment of the present invention is described with reference to drawings. FIG. 1A is a perspective view showing an appearance of the power storage unit 100. In FIG. 1A, arrows indicating the X-axis direction, the Y-axis direction, and the Z-axis direction are illustrated. The X-axis direction, the Y-axis direction, and the Z-axis direction are orthogonal to one another. FIG. 1B is a front view of the power storage unit 100 seen from the Z-axis direction. FIG. 1C is a side view of the power storage unit 100 seen from the Y-axis direction.

Figure 2A:
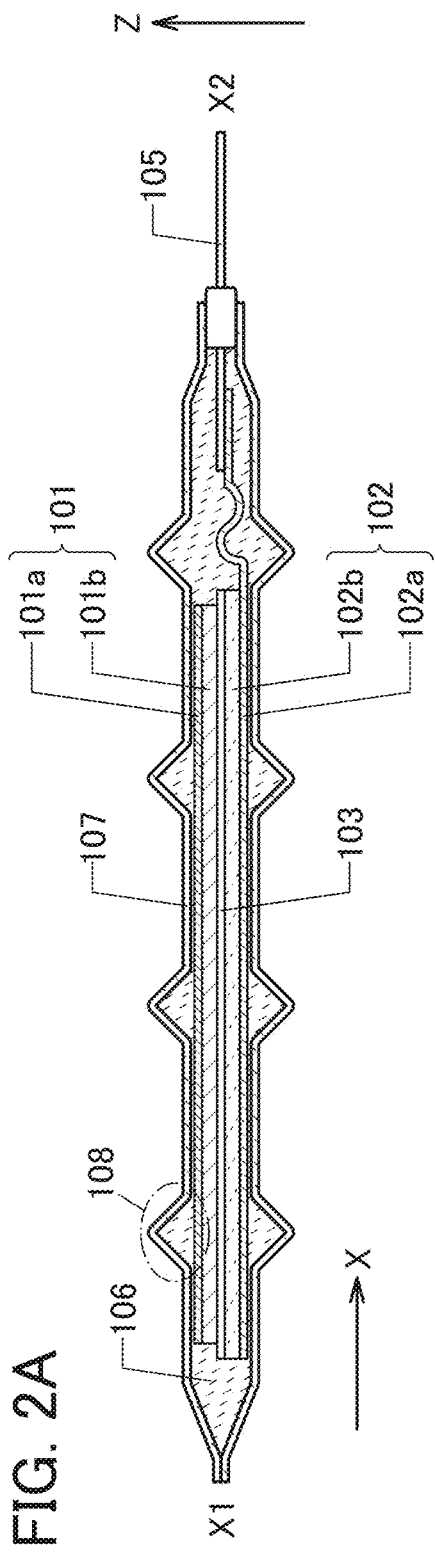
FIGS. 2A to 2C illustrate an example of a power storage unit.
Figure 2C:
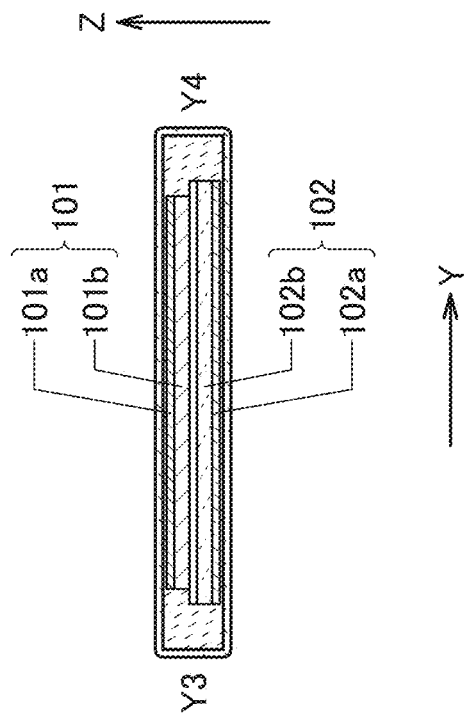
Figure 2B:
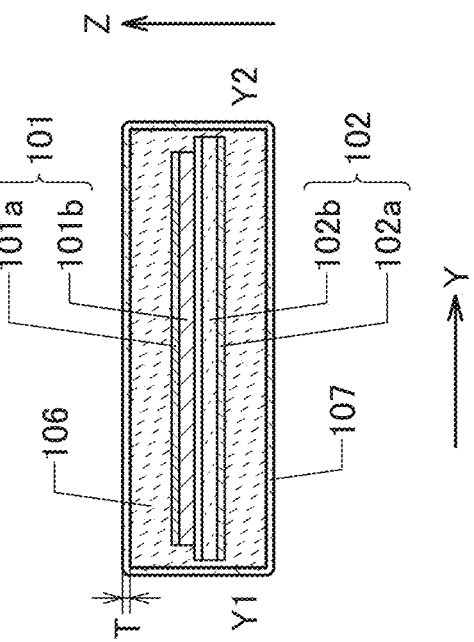

FIG. 2A is a cross-sectional view taken along the dashed-dotted line X1-X2 (the dashed-dotted line parallel to the X-axis direction) in FIG. 1B. FIG. 2B is a cross-sectional view taken along the dashed-dotted line Y1-Y2 (the dashed-dotted line parallel to the Y-axis direction) in FIG. 1B. FIG. 2C is a cross-sectional view taken along the dashed-dotted line Y3-Y4 (the dashed-dotted line parallel to the Y-axis direction) in FIG. 1B.

The power storage unit 100 of one embodiment of the present invention includes projections 108 which protrude in the Z-axis direction and whose ridgelines extend in the Y-axis direction on the front and the back of the power storage unit 100. Furthermore, the power storage unit 100 includes depressions 109 which are recessed in the Y-axis direction and whose valley lines extend in the Z-axis direction on the sides of the power storage unit 100. More specifically, the projections 108 and the depressions 109 are provided on an exterior body 107. Note that a ridgeline P of the projection 108 provided on the front of the power storage unit 100 is parallel to a ridgeline P of the projection 108 provided on the back of the power storage unit 100. Furthermore, a valley line V of the depression 109 provided on one side of the power storage unit 100 is parallel to a valley line V of the depression 109 provided on the other side of the power storage unit 100. Furthermore, the ridgeline P of the projection 108 provided on the front or the back of the power storage unit 100 is orthogonal to the valley line V of the depression 109 provided on either side of the power storage unit 100 in some cases.

In this specification and the like, a "ridgeline" is, for example, a line following the top of the projection 108. Note that an extended line of the ridgeline is included in the "ridgeline" in some cases. Furthermore, in this specification and the like, a "valley line" is, for example, a line following the bottom of the depression 109. Note that an extended line of the valley line is included in the "valley line" in some cases.

In this specification and the like, a line which seems like a ridge when two surfaces are in contact with each other or an extended line of the line is referred to as a "ridgeline" in some cases. Furthermore, a line which seems like the bottom of a valley when two surfaces are in contact with each other or an extended line of the line is referred to as a "valley line" in some cases.

In FIGS. 1A to 1C, the projection 108 includes two valley lines V between which the ridgeline P is positioned. The two valley lines V extend in a direction parallel to the ridgeline P. The depression 109 includes two ridgelines P between which the valley line V is positioned. The two ridgelines P extend in a direction parallel to the valley line V. The projection 108 and the depression 109 are arranged such that that the ridgeline P of the projection 108 intersects with the valley line V of the depression 109. Furthermore, the projection 108 and the depression 109 are arranged such that the valley lines V of the projection 108 intersect with the ridgelines P of the depression 109.

The projection 108 includes a region overlapping with a positive electrode 101, a negative electrode 102, and a separator 103 in the Z-axis direction (see FIG. 2A). That is, the ridgeline P of the projection 108 includes a region overlapping with the positive electrode 101, the negative electrode 102, and the separator 103 in the Z-axis direction. Furthermore, the depression 109 includes a region overlapping with the positive electrode 101, the negative electrode 102, and the separator 103 in the Y-axis direction. That is, the valley line V of the depression 109 includes a region overlapping with the positive electrode 101, the negative electrode 102, and the separator 103 in the Y-axis direction.

A width J of the projection 108 (the distance between the valley lines V of the projection 108) is preferably 0.5 to 5 times a height M of the projection 108, further preferably 1 to 3 times the height M of the projection 108. Furthermore, a width J of the depression 109 (the distance between the ridgelines P of the depression 109) is preferably 0.5 to 5 times a depth N of the depression 109, further preferably 1 to 3 times the depth N of the depression 109. Moreover, the height M and the depth N are each preferably 3 or more times, further preferably 10 or more times, still further preferably 20 or more times a thickness T of the exterior body 107 (see FIG. 2B).

A pitch L in FIG. 1C is a distance between the ridgelines P of adjacent projections 108. Furthermore, the pitch L is a distance between the valley lines V of adjacent depressions 109.

In the case where the exterior body 107 has two or more projections 108, the projections 108 may have different heights M and different widths J. In the case where the exterior body 107 has two or more depressions 109, the depressions 109 may have a different depths N and different widths J. In the case where the exterior body 107 includes three or more projections 108, pitches L may be different from each other. Furthermore, in the case where the exterior body 107 includes three or more depressions 109, pitches L may be different from each other.

The power storage unit 100 of one embodiment of the present invention includes, in a space surrounded by the exterior body 107 (hereinafter also referred to as "in the exterior body 107"), the positive electrode 101 including a positive electrode current collector 101a and a positive electrode active material layer 101b, the negative electrode 102 including a negative electrode current collector 102a and a negative electrode active material layer 102b, the separator 103, and an electrolyte solution 106.

Although in this embodiment, one positive electrode 101 and one negative electrode 102 are provided in the exterior body 107, a plurality of positive electrodes 101 and a plurality of negative electrodes 102 may be provided in the exterior body 107. The power storage capacity of the power storage unit 100 can be increased by an increase in the number of the positive electrodes 101 and the number of the negative electrodes 102 in the power storage unit 100.

The positive electrode 101 is electrically connected to a positive electrode lead 104 and the negative electrode 102 is electrically connected to a negative electrode lead 105. The positive electrode lead 104 and the negative electrode lead 105 are partly positioned outside the exterior body. The power storage unit 100 is charged and discharged through the positive electrode lead 104 and the negative electrode lead 105. Each of the positive electrode lead 104 and the negative electrode lead 105 is also referred to as a lead electrode or a lead terminal.

Note that although FIGS. 2A to 2C illustrate an example in which the plate-shaped separator 103 is interposed between the positive electrode 101 and the negative electrode 102, one embodiment of the present invention is not limited to this structure. For example, at least one of the positive electrode 101 and the negative electrode 102 may be surrounded by a bag-shaped separator.

Figure 3A:
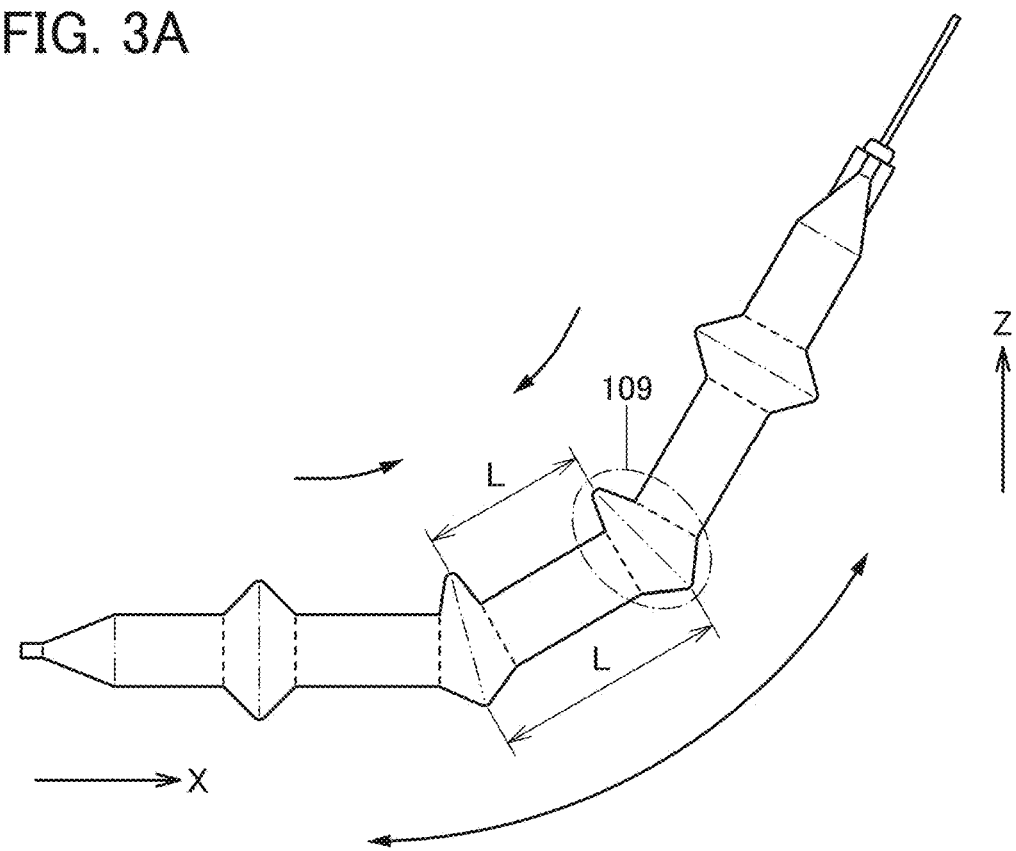
FIGS. 3A and 3B illustrate an example of a power storage unit.
Figure 3B:
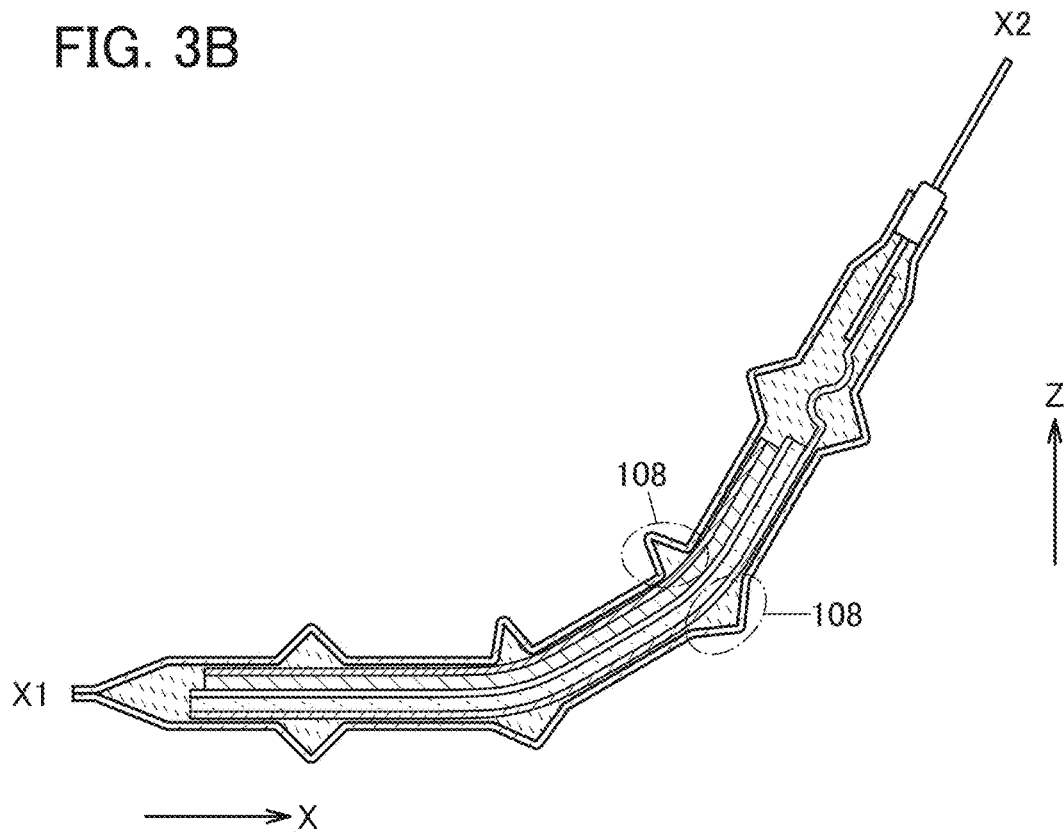

FIG. 3A is a side view of the power storage unit 100 bent in the Z-axis direction and seen from the Y-axis direction. FIG. 3B is a cross-sectional view of the power storage unit 100 bent in the Z-axis direction, which is taken along the dashed-dotted line X1-X2 in FIG. 1B.

As illustrated in FIGS. 3A and 3B, the projections 108 on the inner side of a bent portion change in shape as they shrink, and the projections 108 on the outer side of the bent portion change in shape as they expand. In other words, the pitch L on the inner side of the bent portion decreases and the pitch L on the outer side of the bent portion increases. The depressions 109 provided on the sides of the power storage unit 100 change in shape in response to the change in the projections 108 (change in the pitch L) provided on the front and the back of the power storage unit 100. Flexibility of the power storage unit 100 can be increased by providing not only the projections 108 on the front and the back of the power storage unit 100 but also the depressions 109 on the sides of the power storage unit 100.

Figure 4:
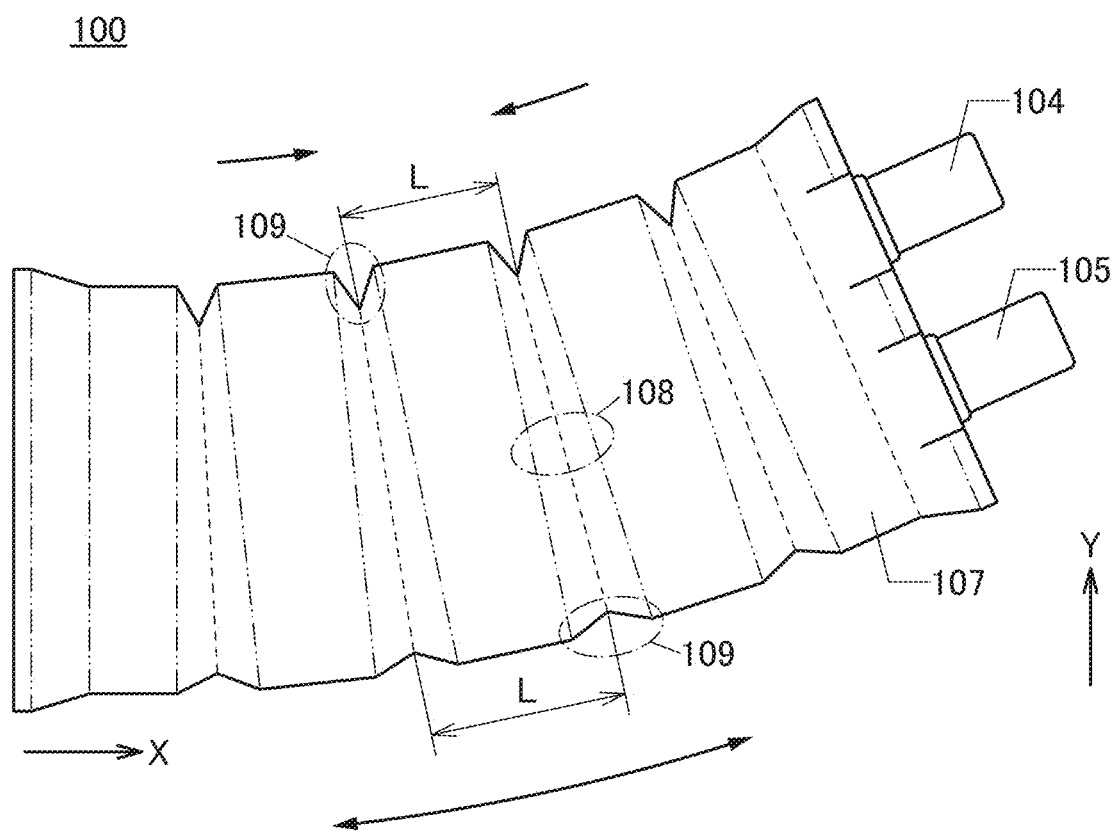
FIG. 4 illustrates an example of a power storage unit.

The power storage unit 100 can also be bent in the Y-axis direction. FIG. 4 is a front view of the power storage unit 100 bent in the Y-axis direction and seen from the Z-axis direction. As illustrated in FIG. 4, the depressions 109 on the inner side of a bent portion change in shape as they shrink, and the depressions 109 on the outer side of the bent portion change in shape as they expand. In other words, the pitch L on the inner side of the bent portion decreases and the pitch L on the outer side of the bent portion increases. The projections 108 provided on the front and the back of the power storage unit 100 change in shape in response to the change in the depressions 109 (change in the pitch L) provided on the sides of the power storage unit 100. The power storage unit 100 of one embodiment of the present invention can have increased flexibility not only in the Z-axis direction but also in the Y-axis direction.

The exterior body 107 is provided with the projection 108 and the depression 109 such that the ridgeline 108 of the projection 108 and the valley line of the depression 109 intersect with each other; thus, flexibility of the power storage unit 100 is increased, and a highly reliable power storage unit that is less likely to be broken can be obtained.

Modification Example 1

Figure 5A:
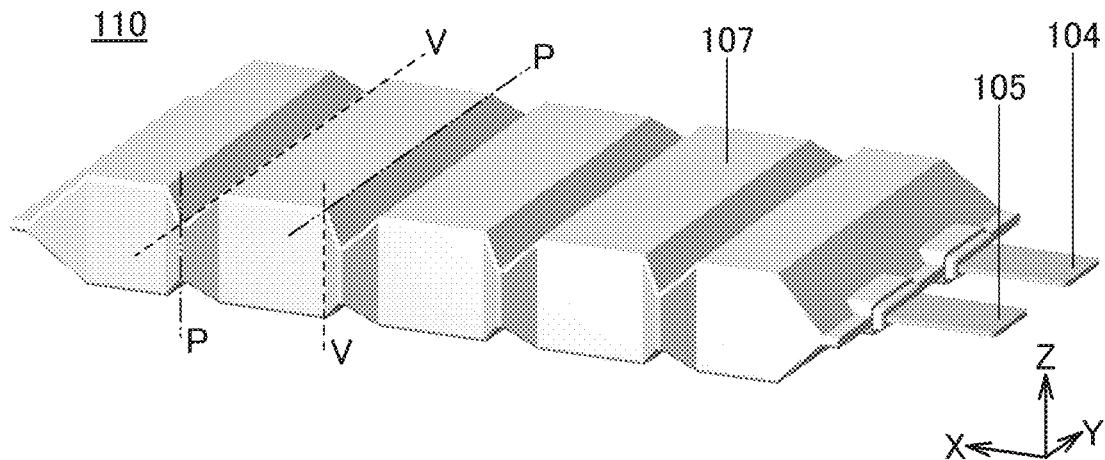
FIGS. 5A to 5C illustrate an example of a power storage unit.
Figure 5B:
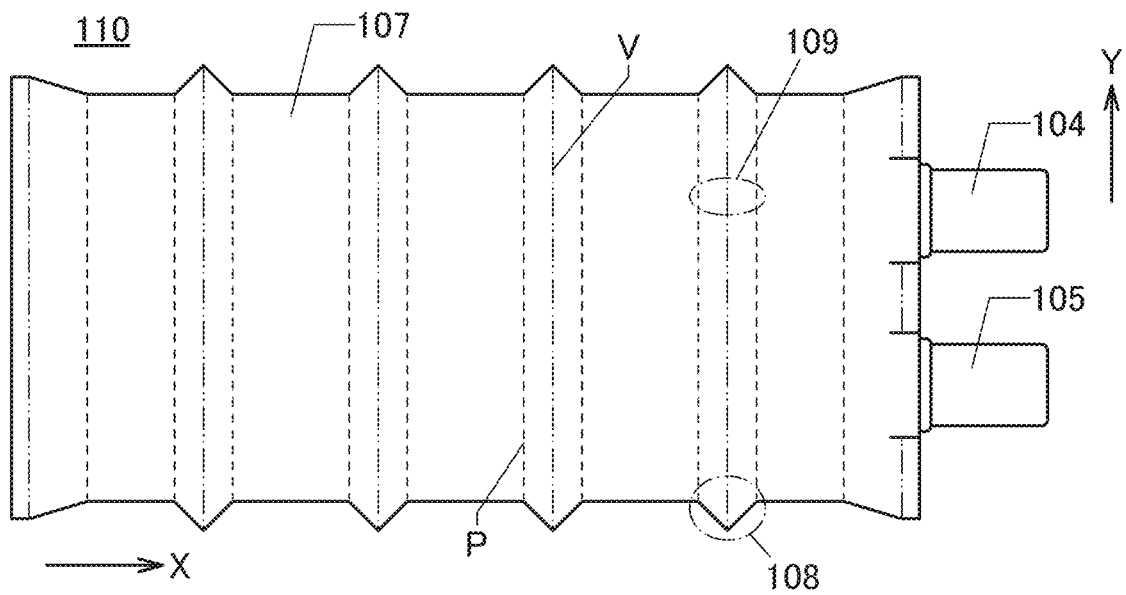
Figure 5C:
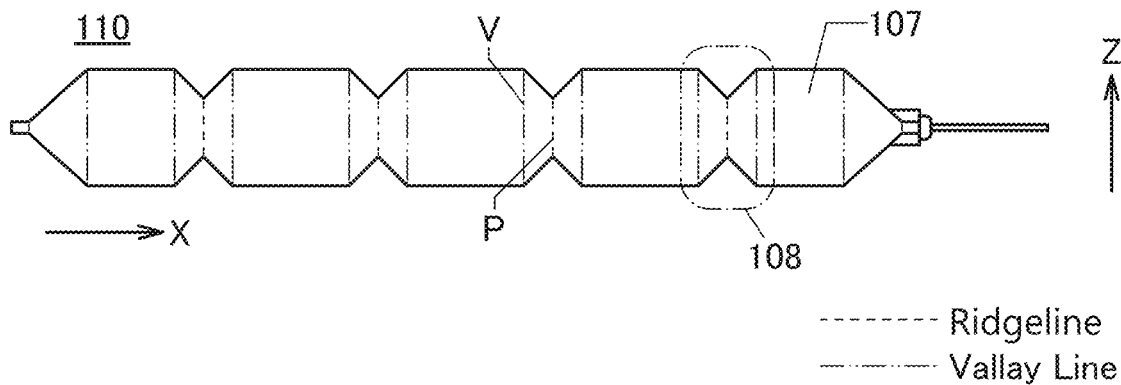

FIGS. 5A to 5C illustrate a power storage unit 110 as a modification example of the power storage unit 100. FIG. 5A is a perspective view illustrating an appearance of the power storage unit 110. FIG. 5B is a front view of the power storage unit 110 seen from the Z-axis direction. FIG. 5C is a side view of the power storage unit 110 seen from the Y-axis direction.

The power storage unit 110 includes the depressions 109 which are recessed in the Z-axis direction on the front and the back of the power storage unit 110. The valley line V of the depression 109 extends in the Y-axis direction. Furthermore, the power storage unit 110 includes the projections 108 which protrude in the Y-axis direction on the sides of the power storage unit 110. The ridgeline of the projection 108 extends in the Z-axis direction.

The projections 108 and the depressions 109 are arranged such that the ridgeline P of the projection 108 intersects with the valley line V of the depression 109 and the valley lines V of the projection 108 intersect with the ridgelines P of the depression 109.

In the power storage unit 110, the depression 109 includes a region overlapping with the positive electrode 101, the negative electrode 102, and the separator 103 in the Z-axis direction. That is, the valley line V of the depression 109 includes a region overlapping with the positive electrode 101, the negative electrode 102, and the separator 103 in the Z-axis direction. Furthermore, the projection 108 includes a region overlapping with the positive electrode 101, the negative electrode 102, and the separator 103 in the Y-axis direction. That is, the ridgeline P of the projection 108 includes a region overlapping with the positive electrode 101, the negative electrode 102, and the separator 103 in the Y-axis direction.

Flexibility of the power storage unit 110 can be increased by providing not only the projections 108 on the front and the back of the power storage unit 110 but also the depressions 109 on the sides of the power storage unit 100. Note that the valley line V of the depression 109 provided on the front of the power storage unit 110 is parallel to the valley line V of the depression 109 provided on the back of the power storage unit 110. Furthermore, the ridgeline P of the projection 108 provided on one side of the power storage unit 110 is parallel to the ridgeline P of the projection 108 provided on the other side of the power storage unit 110. Furthermore, the valley line V of the depression 109 on the front or the back of the power storage unit 110 is orthogonal the ridgeline P of the projection 108 provided on either side of the power storage unit 110 in some cases.

Note that the other structures of the power storage unit 110 are the same as those of the power storage unit 100. Thus, detailed description is omitted here.

Modification Example 2

Figure 6A:
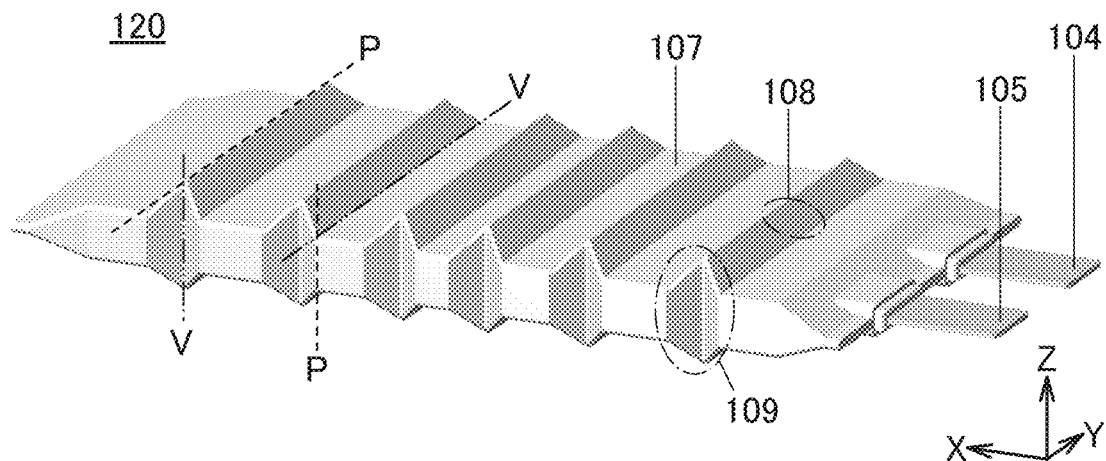
FIGS. 6A to 6C illustrate an example of a power storage unit.
Figure 6B:
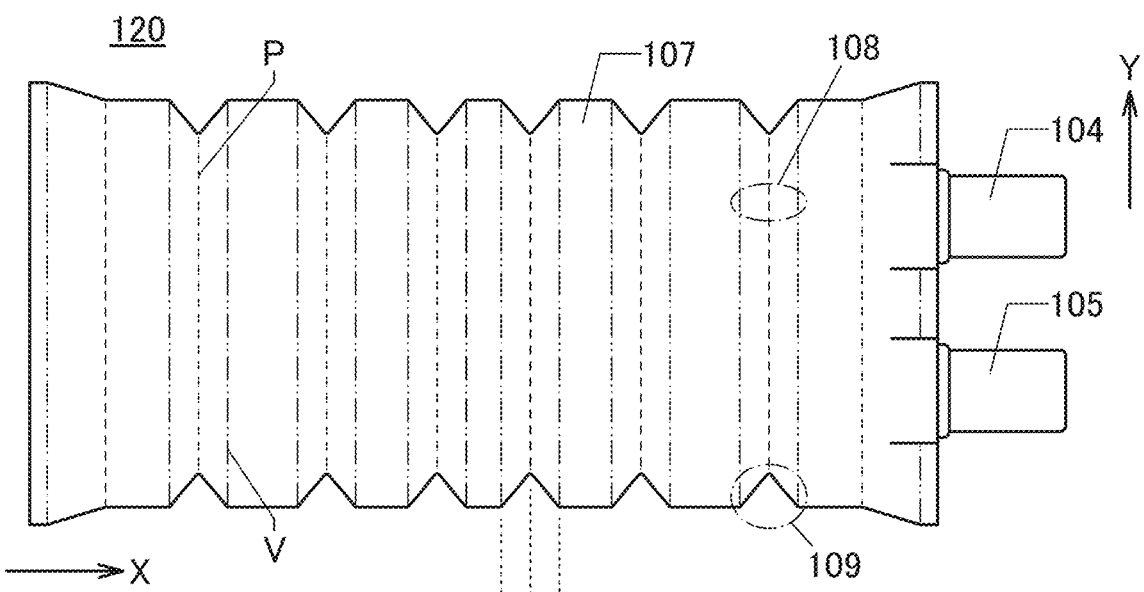
Figure 6C:
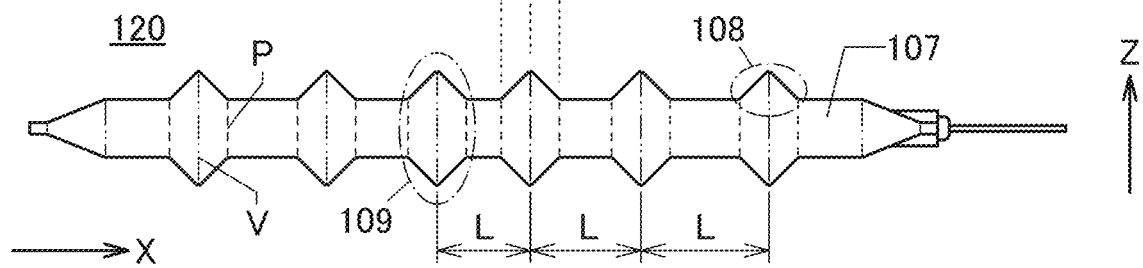

FIGS. 6A to 6C illustrate a power storage unit 120 as a modification example of the power storage unit 100. FIG. 6A is a perspective view illustrating an appearance of the power storage unit 120. FIG. 6B is a front view of the power storage unit 120 seen from the Z-axis direction. FIG. 6C is a side view of the power storage unit 120 seen from the Y-axis direction.

The power storage unit 120 is provided with a plurality of projections 108 and a plurality of depressions 109 at different intervals (at different pitches L) on the exterior body 107. Note that the other structures of the power storage unit 120 are the same as those of the power storage unit 100. Thus, detailed description is omitted here.

Modification Example 3

Figure 7A:
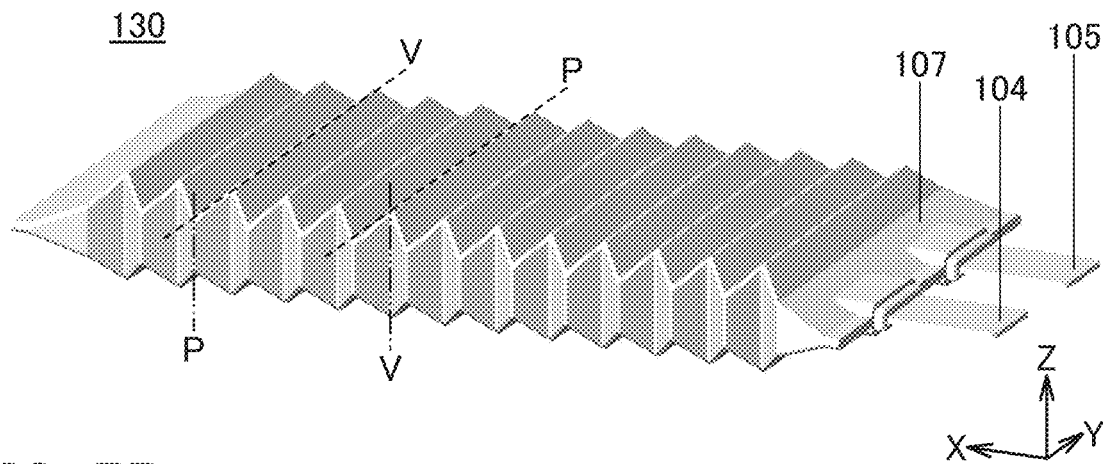
FIGS. 7A to 7C illustrate an example of a power storage unit.
Figure 7B:
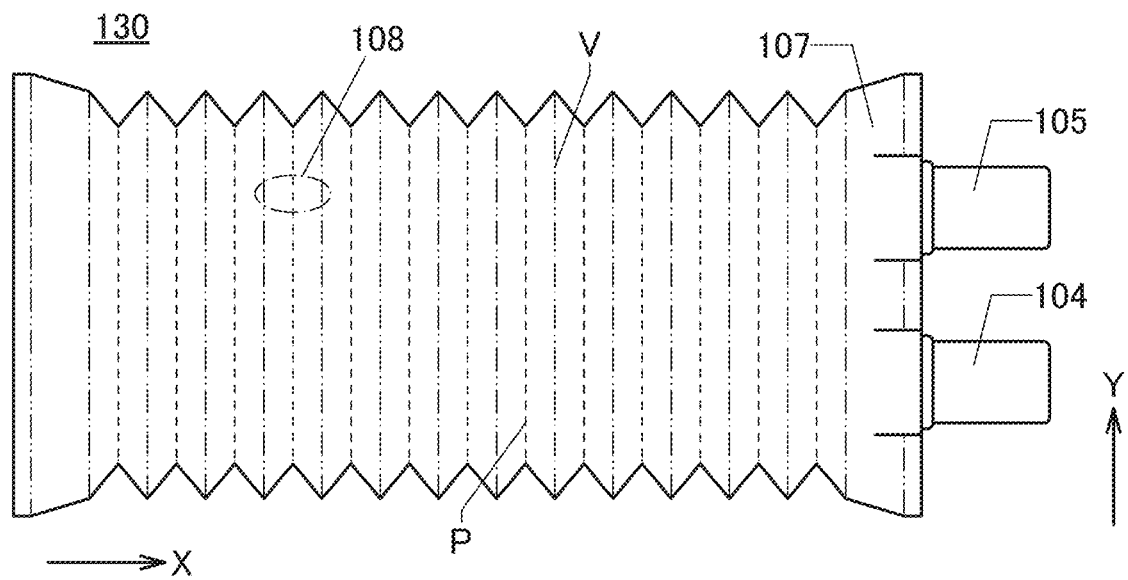
Figure 7C:
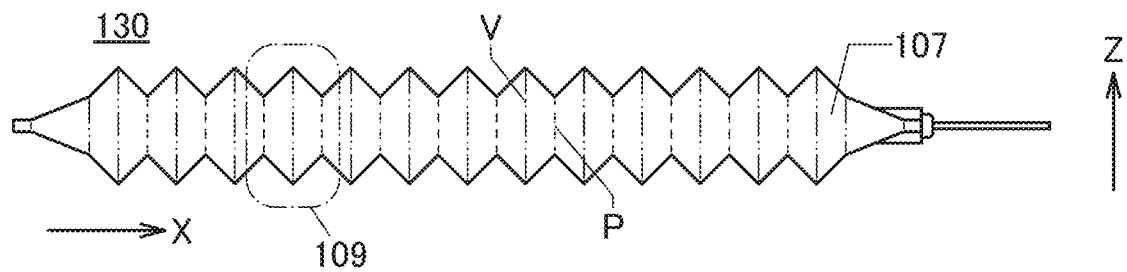

FIGS. 7A to 7C illustrate a power storage unit 130 as a modification example of the power storage unit 100. FIG. 7A is a perspective view illustrating an appearance of the power storage unit 130. FIG. 7B is a front view of the power storage unit 130 seen from the Z-axis direction. FIG. 7C is a side view of the power storage unit 130 seen from the Y-axis direction.

A plurality of projections 108 protruding in the Z-axis direction is adjacently and repeatedly provided on the front and the back of the power storage unit 130. In addition, a plurality of depressions 109 being recessed in the Y-axis direction is adjacently and repeatedly provided on the sides of the power storage unit 130.

It can also be said that a plurality of depressions 109 being recessed in the Z-axis direction is adjacently and repeatedly provided on the front and the back of the power storage unit 130. Similarly, it can also be said that a plurality of projections 108 protruding in the Y-axis direction is adjacently and repeatedly provided on the sides of the power storage unit 130.

As described above, the ridgelines P and valley lines V are alternately provided on the front, the back and the sides of the power storage unit 130. Furthermore, the ridgelines P on the front and back of the power storage unit 130 intersect with the valley lines V on the sides of the power storage unit 130. The valley lines V on the front and back of the power storage unit 130 intersect with the ridgelines P on the sides of the power storage unit 130.

Flexibility of the power storage unit 130 can be further increased when the plurality of projections 108 and the plurality of depressions 109 are provided adjacently. Note that the other structures of the power storage unit 130 are the same as those of the power storage unit 100. Thus, detailed description is omitted here.

Modification Example 4

The cross-sectional shape in the direction perpendicular to the ridgeline P of the projection 108 and the cross-sectional shape in the direction perpendicular to the valley line V of the depression 109 may include a straight line, a curved line, or a combination of straight and curved lines. For example, the cross-sectional shape may have a circular arc shape, a wedge shape, or a wedge shape with a rounded tip. The projections 108 may have different cross sections. Furthermore, the depression 109 may have different cross sections.

Figure 8A:
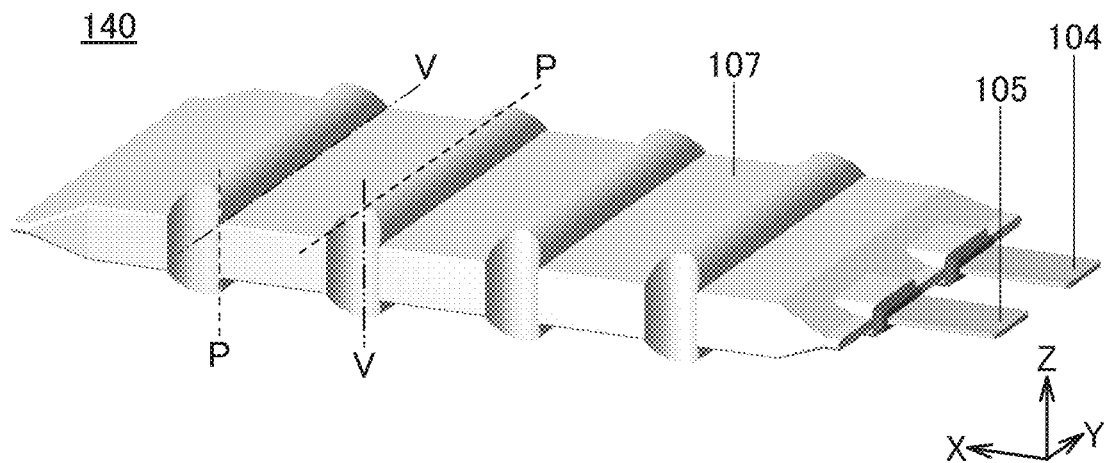
FIGS. 8A to 8C illustrate an example of a power storage unit.
Figure 8B:
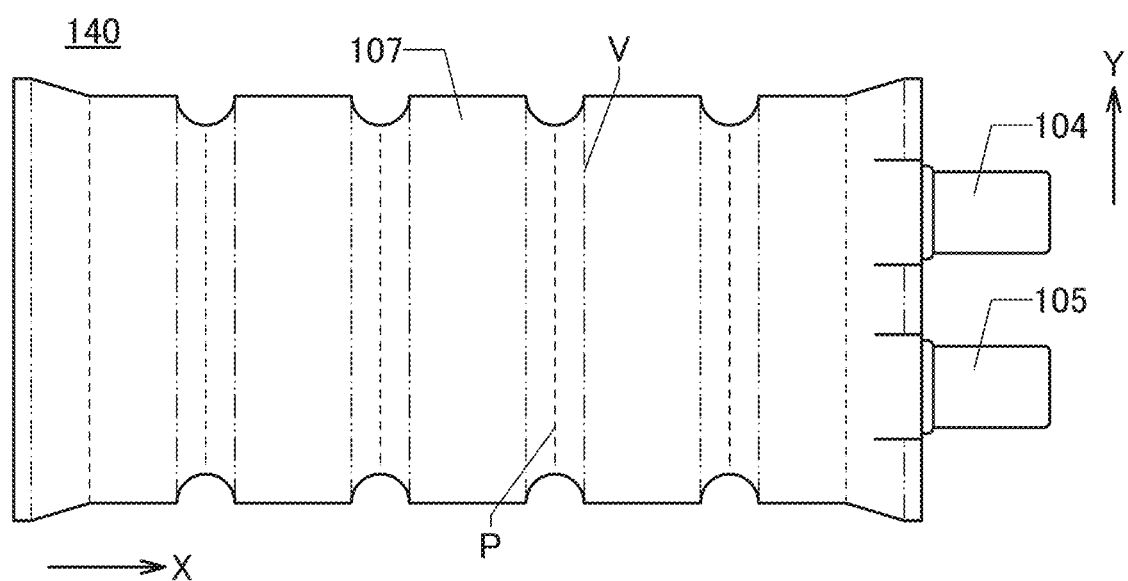
Figure 8C:
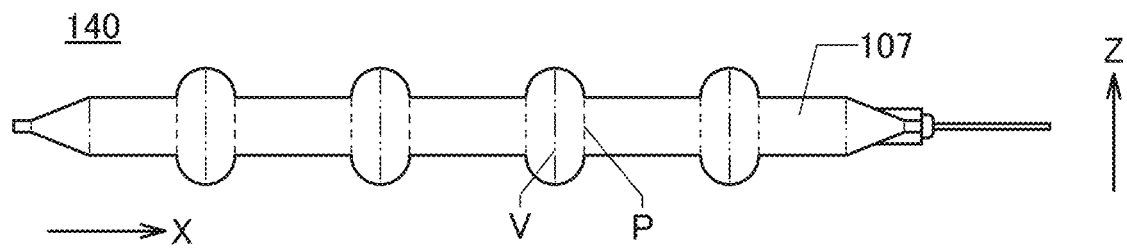

FIGS. 8A to 8C illustrate a power storage unit 140 as a modification example of the power storage unit 100. FIG. 8A is a perspective view illustrating an appearance of the power storage unit 140. FIG. 8B is a front view of the power storage unit 140 seen from the Z-axis direction. FIG. 8C is a side view of the power storage unit 140 seen from the Y-axis direction.

In the power storage unit 140, the cross section of the projection 108 in the direction perpendicular to the ridgeline P and the cross section of the depression 109 in the direction perpendicular to the valley line V have circular arc shapes. Note that the other structures of the power storage unit 140 are the same as those of the power storage unit 100. Thus, detailed description is omitted.

<Structure and Manufacturing Method of Components>

Next, a structure and a manufacturing method of components of the power storage unit 100 are described.

[1. Positive Electrode]

Figure 9A:
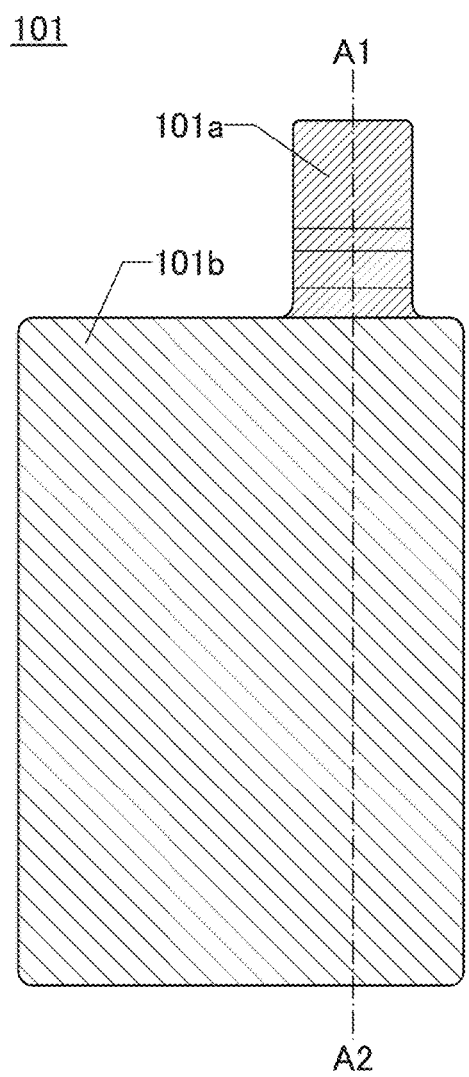
FIGS. 9A to 9C illustrate examples of a positive electrode.
Figure 9B:
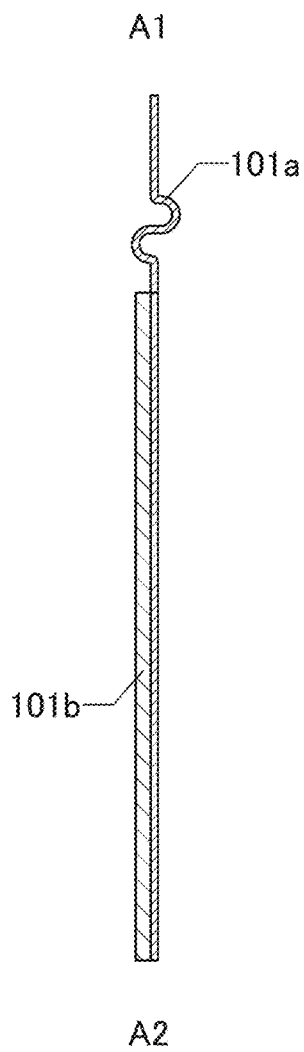
Figure 9C:
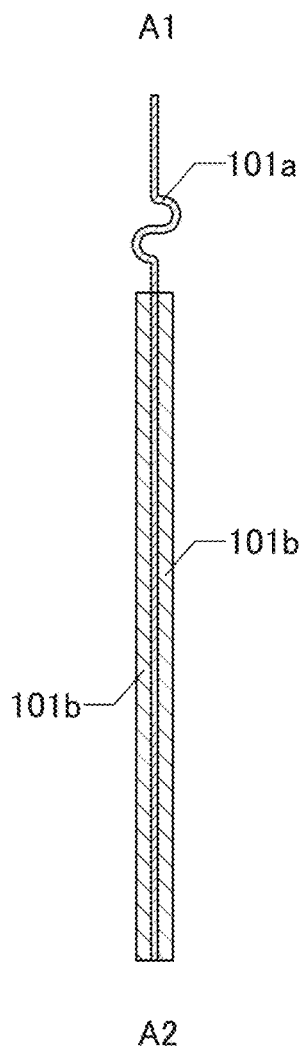

The positive electrode 101 is illustrated as an example in FIGS. 9A to 9C. FIG. 9A is a front view of the positive electrode 101, and FIGS. 9B and 9C are cross-sectional views taken along the dashed-dotted line A1-A2 in FIG. 9A. The positive electrode 101 includes the positive electrode current collector 101a, the positive electrode active material layer 101b formed on the positive electrode current collector 101a, and the like. FIG. 9B illustrates an example in which the positive electrode active material layer 101b is provided on one surface of the sheet-shaped positive electrode current collector 101a.

FIG. 9C illustrates an example in which the positive electrode active material layer 101b is provided on each surface of the sheet-shaped positive electrode current collector 101a. Providing the positive electrode active material layer 101b on each surface of the positive electrode current collector 101a allows the power storage unit 100 to have increased charge and discharge capacity. Alternatively, it is possible to prepare two positive electrodes 101 each including the positive electrode active material layer 101b on one surface of the positive electrode current collector 101a, where surfaces each of which is not provided with the positive electrode active material layer 101b overlap to face each other.

Furthermore, although the positive electrode active material layer 101b may be provided on the whole positive electrode current collector 101a, the positive electrode active material layer 101b may be provided on part of the positive electrode current collector 101a. For example, the positive electrode active material layer 101b is not provided on a portion of the positive electrode current collector 101a which is to be in contact with the positive electrode lead 104 (hereinafter, the portion is also referred to as a "positive electrode tab").

The positive electrode current collector 101a can be formed using a material that has high conductivity and does not dissolve at the potential of the positive electrode, such as a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101a can have a foil shape, a plate shape (sheet shape), a net shape, a punching-metal shape, an expanded-metal shape, or the like as appropriate. The positive electrode current collector 101a preferably has a thickness greater than or equal to 5 μm and less than or equal to 30 μm. The surface of the positive electrode current collector 101a may be provided with an undercoat using graphite or the like.

The positive electrode active material layer 101b may further include a binder for increasing adhesion of positive electrode active materials, a conductive additive for increasing the conductivity of the positive electrode active material layer 101b, and the like in addition to the positive electrode active material.

Figure 10:
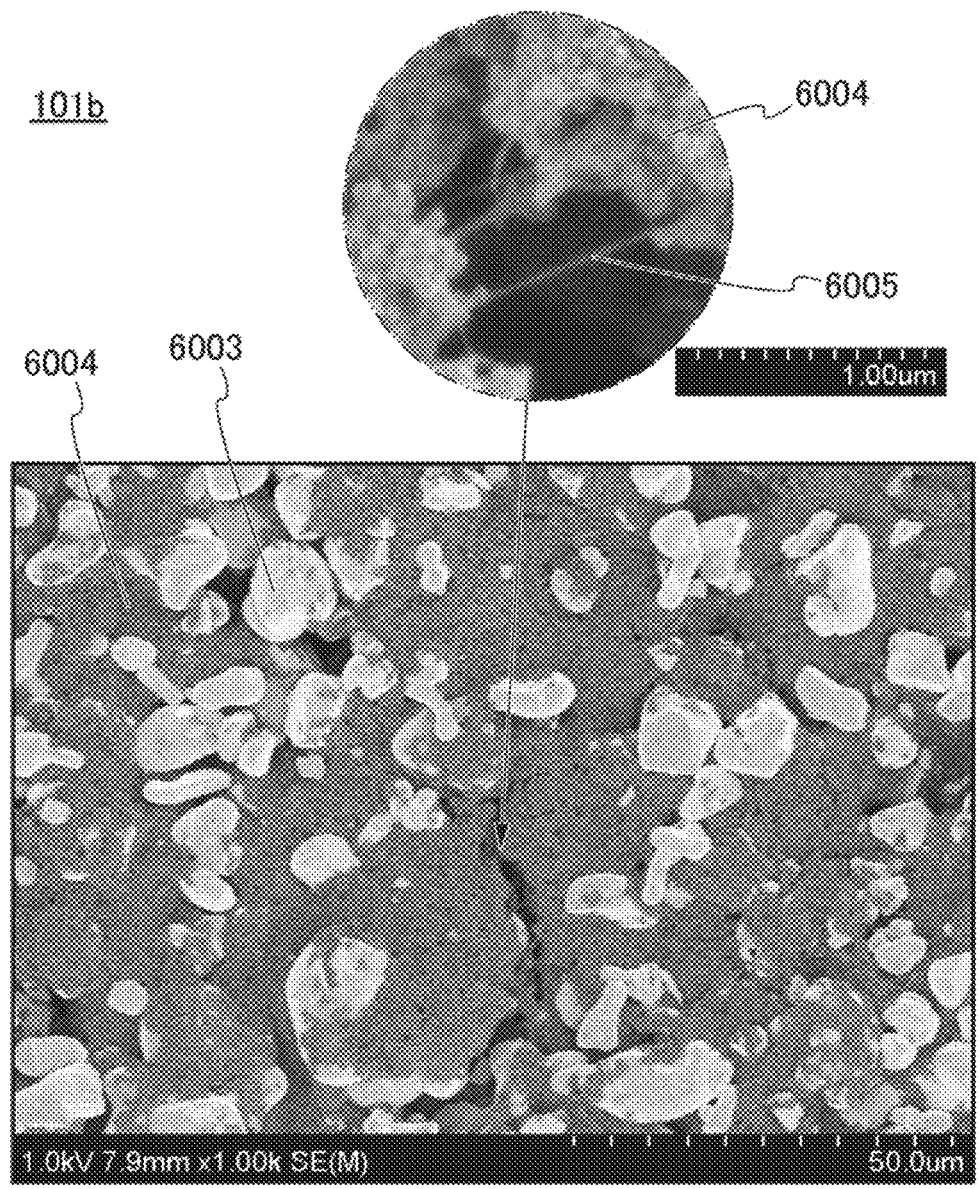
FIG. 10 shows an example of a positive electrode active material.

FIG. 10 shows a photograph of a surface of the positive electrode active material layer 101b, which is observed with a scanning electron microscope (SEM). The positive electrode active material layer 101b shown in FIG. 10 includes particles of a positive electrode active material 6003, a conductive additive 6004, and a binder 6005.

The positive electrode active material 6003 is in the form of particles made of secondary particles having an average particle diameter and particle diameter distribution, which are obtained in such a way that material compounds are mixed at a predetermined ratio and baked and the resulting baked product is crushed, granulated, and classified by an appropriate means. For this reason, the shape of the positive electrode active material is not limited to that shown as an example in FIG. 10. The shape of the positive electrode active material 6003 may be a given shape such as a particle shape, a plate shape, a rod shape, a cylindrical shape, a powder shape, or a flake shape. Furthermore, the positive electrode active material 6003 may have a three-dimensional shape such as unevenness on a surface with a plate shape, fine unevenness on a surface, or a porous shape.

Examples of the positive electrode active material 6003 include a composite oxide with an olivine crystal structure, a composite oxide with a layered rock-salt crystal structure, and a composite oxide with a spinel crystal structure. As the positive electrode active material 6003, a compound such as $LiFeO_2$, $LiCoO_2$, $LiNiO_2$, $LiMn_2O_4$, $V_2O_5$, $Cr_2O_5$, and $MnO_2$ is used.

In particular, $LiCoO_2$ is preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ (0<X<1, M=Co, Al, or the like) to a material with a spinel crystal structure that contains manganese such as $LiMn_2O_4$ because the dissolution of manganese and the decomposition of an electrolyte solution can be suppressed, for example.

Alternatively, a complex material ($LiMPO_4$ (general formula) (M is one or more of Fe(II), Mn(II), Co(II), and Ni(II))) can be used. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

In particular, $LiFePO_4$ is preferable because it properly satisfies conditions necessary for the positive electrode active material, such as safety, stability, high capacity density, high potential, and the existence of lithium ions which can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material 6003. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material 6003, for example.

In the case where carrier ions are alkali metal ions other than lithium ions or alkaline-earth metal ions, the following may be used as the positive electrode active material: an alkali metal (e.g., sodium or potassium) or an alkaline-earth metal (e.g., calcium, strontium, barium, beryllium, or magnesium). For example, the positive electrode active material 6003 may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material 6003. For example, the positive electrode active material 6003 may be a solid solution containing any of the aforementioned materials, e.g., a solid solution containing $LiCo_{1/3}Mn_{1/3}Ni_{1/3}O_2$ and $Li_2MnO_3$.

Note that although not shown, a conductive material such as a carbon layer may be provided on a surface of the positive electrode active material layer 101b. With the conductive material such as the carbon layer, conductivity of the electrode can be increased. For example, the positive electrode active material layer 101b can be coated with the carbon layer by mixing a carbohydrate such as glucose at the time of baking the positive electrode active material.

The average particle diameter of the primary particle of the positive electrode active material 6003 is preferably greater than or equal to 50 nm and less than or equal to 100 μm.

Examples of the conductive additive 6004 include a carbon material, a metal material, and a conductive ceramic material. Alternatively, a fiber material may be used as the conductive additive 6004. The content of the conductive additive in the positive active material is preferably greater than or equal to 1 wt % and less than or equal to 10 wt %, more preferably greater than or equal to 1 wt % and less than or equal to 5 wt %.

A network for electrical conduction can be formed in the positive electrode active material layer 101b by the conductive additive 6004. The conductive additive 6004 also allows maintaining of a path for electric conduction between the positive electrode active materials. The addition of the conductive additive 6004 to the positive electrode active material layer 101b increases the electron conductivity of the positive electrode active material layer 101b.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase the contact points and contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %. Note that, graphene oxide may be reduced by heat treatment or with the use of a reducing agent, for example.

Graphene is capable of making low-resistance surface contact and has extremely high conductivity even with a small thickness. Therefore, even a small amount of graphene can efficiently form a conductive path in an active material layer. Furthermore, graphene oxide has extremely high dispersibility in a polar solvent and thus is easily dispersed uniformly. The solvent is removed by volatilization from a dispersion medium in which graphene oxide is uniformly dispersed, and the graphene oxide is reduced to graphene; hence, the graphene flakes remaining in the positive electrode active material 6003 partly overlap with each other and are dispersed such that surface contact is made, thereby forming a favorable electrical conduction path.

In the case where an active material with a small average particle size (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount be used.

Graphene flakes are bonded to each other to form net-like graphene (hereinafter referred to as a graphene net). The graphene net covering the active material can also function as a binder for binding particles. The amount of a binder can thus be reduced, or the binder does not have to be used. This can increase the proportion of the active material in the electrode volume or weight. That is to say, the capacity of the power storage device can be increased.

Electrodes used for the power storage unit of one embodiment of the present invention can be fabricated by various methods. For example, in the case where an active material layer is formed over a current collector by a coating method, the active material, the binder, the conductive additive, and the dispersion medium (also referred to as solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, polar organic solvent such as N-methylpyrrolidone (NMP) or dimethylformamide, or the like can be used. Water is preferably used in terms of the safety and cost.

It is preferable for the binder 6005 to include, for example, water-soluble polymers. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder 6005, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is more preferably used in combination with the aforementioned water-soluble polymers.

Alternatively, as the binder 6005, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder 6005.

The content of the binder 6005 in the positive electrode active material layer 101b is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 101b is preferably greater than or equal to 1 wt % and less than or equal to 10 wt %, more preferably greater than or equal to 1 wt % and less than or equal to 5 wt %.

In the case where the positive electrode active material layer 101b is formed by a coating method, the positive electrode active material 6003, the conductive additive 6004, and the binder 6005 are mixed to form a positive electrode paste (slurry), and the positive electrode paste is applied to the positive electrode current collector 101a and dried.

[1.1. Connecting Lead Electrode to Positive Electrode]

Figure 11A:
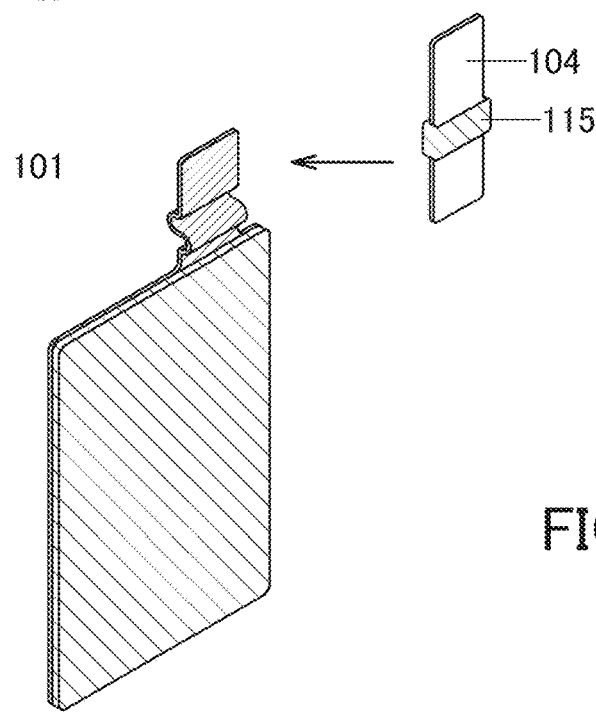
FIGS. 11A to 11D illustrate an example of a method for connecting a positive electrode lead to a positive electrode.

After the positive electrode active material layer 101b is formed on the positive electrode current collector 101a, the positive electrode lead 104 provided with a sealing layer 115 is connected to a positive electrode tab of the positive electrode current collector 101a (see FIG. 11A). The positive electrode tab and the positive electrode lead 104 are electrically connected by irradiation with ultrasonic waves with pressure applied (ultrasonic welding).

The positive electrode tab to which the positive electrode lead 104 is connected is likely to have a defect such as a crack or a cut owing to stress generated by external force applied after manufacture of the power storage unit.

Figure 11B:
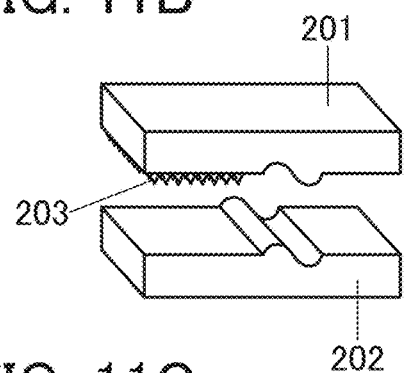

Thus, an ultrasonic welding apparatus including bonding dies illustrated in FIG. 11B is used in this embodiment. Note that only top and bottom bonding dies of the ultrasonic welding apparatus are illustrated in FIG. 11B for simplicity.

The positive electrode tab and the positive electrode lead 104 are placed between a first bonding die 201 provided with projections 203 and a second bonding die 202. When ultrasonic welding is performed with a region to be connected overlapping with the projections 203, a connection region 210 and a bend portion 220 can be formed in the positive electrode tab. FIG. 11C is a perspective view in which the connection region 210 and the bend portion 220 of the positive electrode tab are enlarged.

This bend portion 220 can relieve stress due to external force applied after manufacture of the power storage unit 100. Accordingly, the power storage unit 100 can be highly reliable.

Furthermore, the ultrasonic welding apparatus including the bonding dies illustrated in FIG. 11B can perform ultrasonic welding and form the bend portion 220 at a time; thus, the power storage unit 100 can be manufactured without increasing the number of manufacturing steps. Note that ultrasonic welding and forming the bend portion 220 may be separately performed.

The bend portion 220 is not necessarily formed in the positive electrode tab. The positive electrode current collector may be formed using a high-strength material such as stainless steel to a thickness of 10 μm or less, in order to easily relieve stress due to external force applied after the manufacture of the power storage unit.

It is needless to say that two or more of the above examples may be combined to relieve concentration of stress in the positive electrode tab.

Figure 11D:
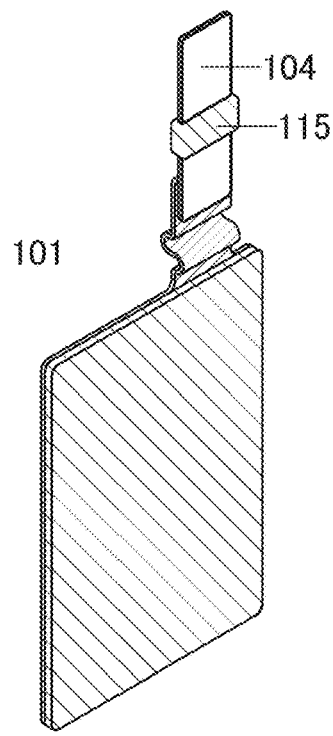
Figure 11C:
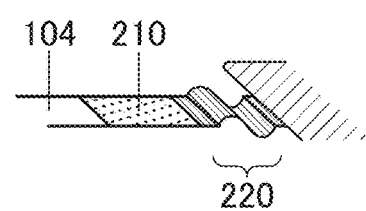

Thus, the positive electrode 101 to which the positive electrode lead 104 is connected can be fabricated (see FIG. 11D).

[2. Negative Electrode]

Figure 12A:
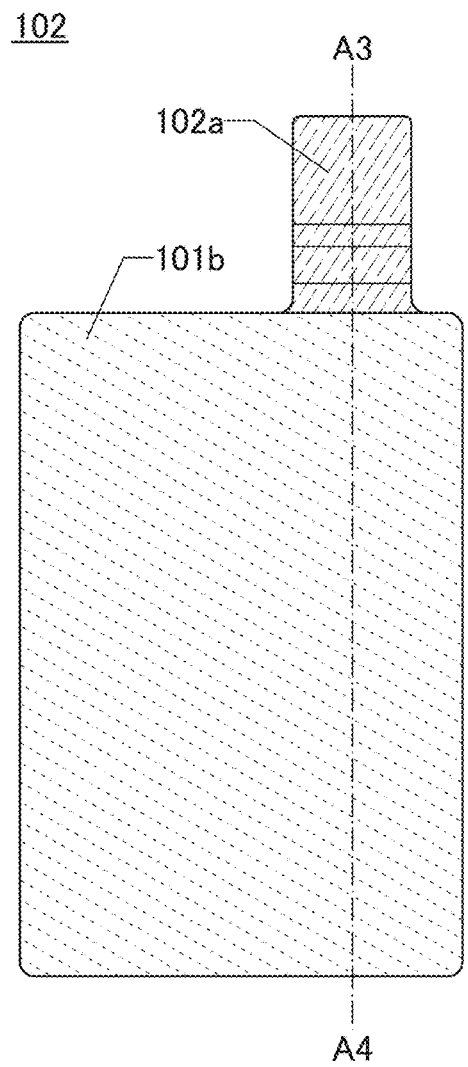
FIGS. 12A to 12C illustrate examples of a negative electrode.
Figures 12B, 12C:
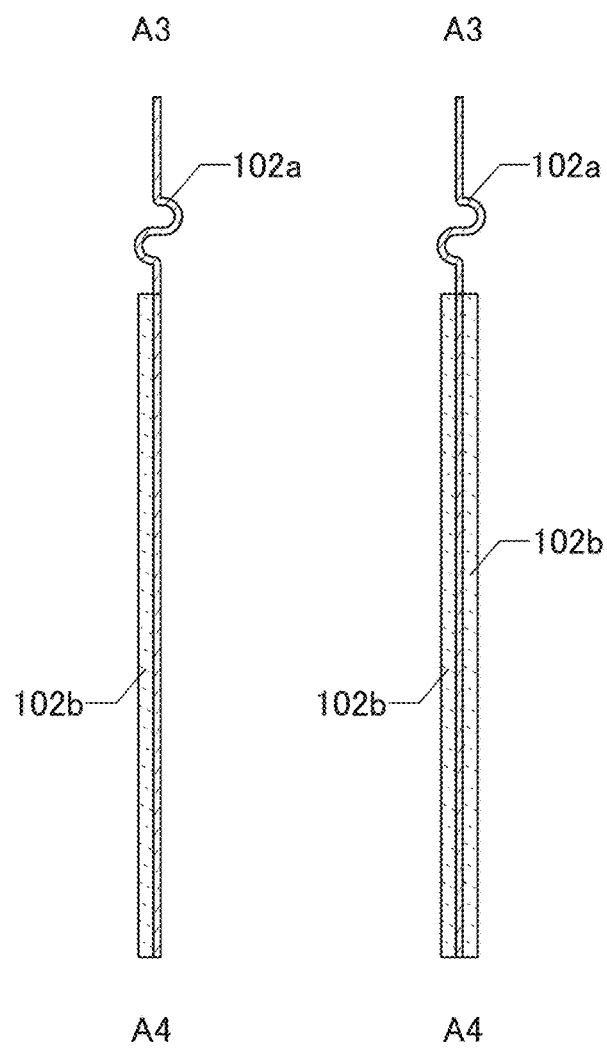

Next, an example of a negative electrode of the power storage unit is described with reference to FIGS. 12A to 12C. FIGS. 12A to 12C illustrate the negative electrode 102 as an example. FIG. 12A is a front view of the negative electrode 102, and FIGS. 12B and 12C are cross-sectional views taken along the dashed-dotted line A3-A4 in FIG. 12A The negative electrode 102 includes the negative electrode current collector 102a, the negative electrode active material layer 102b formed over the negative electrode current collector 102a, and the like. FIG. 12B illustrates an example in which the negative electrode active material layer 102b is provided on one surface of the sheet-shaped negative electrode current collector 102a. FIG. 12C illustrates an example in which the negative electrode active material layer 102b is provided on each surface of the sheet-shaped negative electrode current collector 102a. Providing the negative electrode active material layer 102b on each surface of the negative electrode current collector 102a allows the power storage unit 100 to have increased charge and discharge capacity. Alternatively, it is possible to prepare two negative electrodes 102 each including the negative electrode active material layer 102b provided on one surface of the negative electrode current collector 102a, where surfaces each of which is not provided with the negative electrode active material layer 102b overlap to face each other.

Furthermore, although the negative electrode active material layer 102b may be provided on the whole negative electrode current collector 102a, the negative electrode active material layer 102b may be provided on part of the negative electrode current collector 102a. For example, the negative electrode active material layer 102b is not provided on a portion of the negative electrode current collector 102a which is to be in contact with the negative electrode lead 105 (hereinafter, the portion is also referred to as a "negative electrode tab").

The negative electrode current collector 102a can be formed using a material that has high conductivity and is not alloyed with a carrier ion such as lithium ion or the like, such as stainless steel, gold, platinum, zinc, iron, copper, or titanium, an alloy thereof, or the like. The current collector may be formed using an aluminum alloy to which an element which improves heat resistance, such as silicon, titanium, neodymium, scandium, or molybdenum, is added. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 102a can have a foil-like shape, a plate-like shape (sheet-like shape), a net-like shape, a punching-metal shape, an expanded-metal shape, or the like as appropriate. The negative electrode current collector 102a preferably has a thickness greater than or equal to 5 μm and less than or equal to 30 μm. The surface of the negative electrode current collector 102a may be provided with an undercoat layer using graphite or the like.

Figure 13:
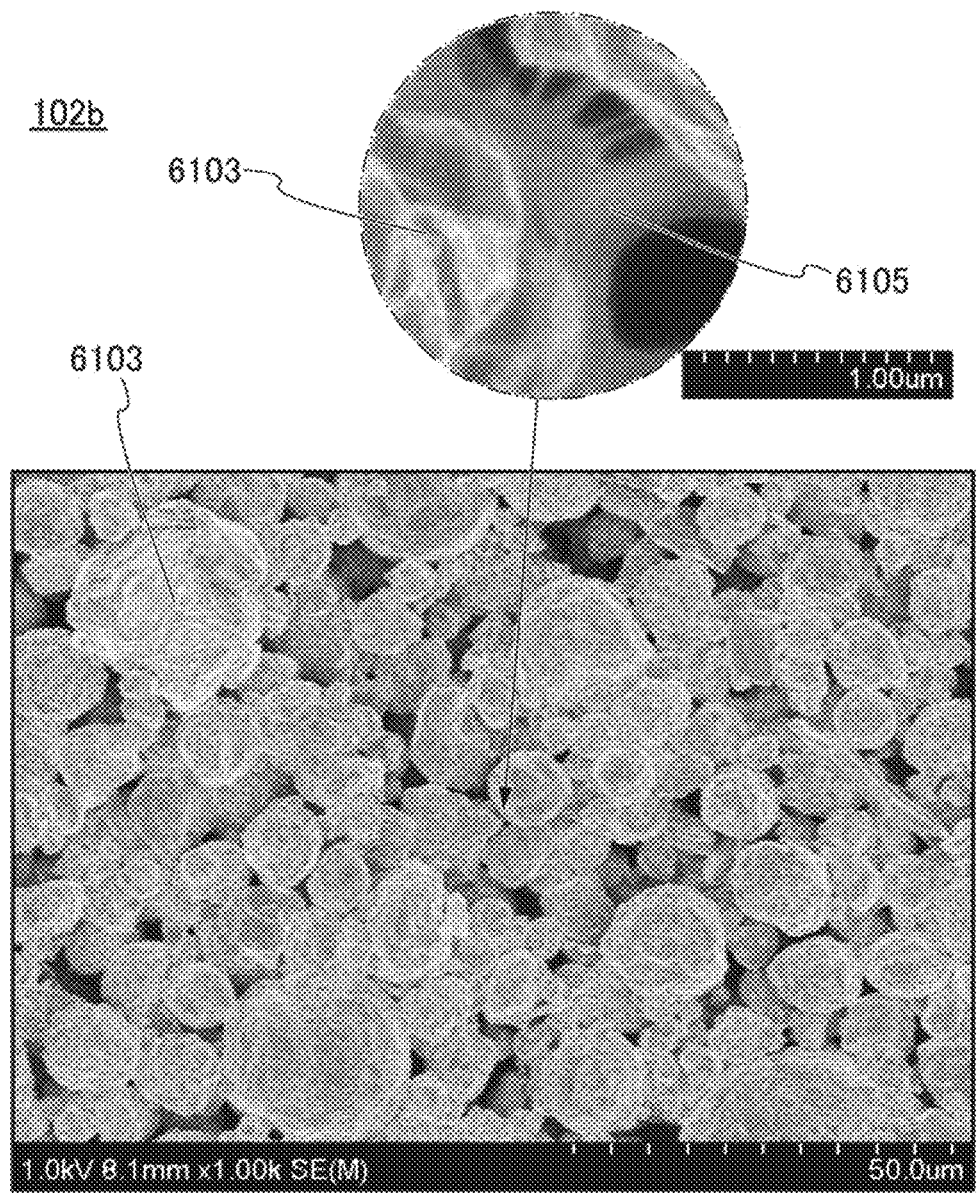
FIG. 13 shows an example of a negative electrode active material.

FIG. 13 shows a photograph of the surface of the negative electrode active material layer 102b as an example, which is observed with a scanning electron microscope. FIG. 13 shows an example in which the negative electrode active material layer 102b includes a negative electrode active material 6103 and a binder (binding agent) 6105, though a conductive additive may be added to the negative electrode active material layer 102b. For the binder and the conductive additive which are used for the negative electrode active material layer 102, refer to the description of the binder and the conductive additive which are used for the positive electrode active material layer 101b.

A material with which lithium can be dissolved and precipitated or a material which can reversibly react with lithium ions can be used for the negative electrode active material 6103; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a power storage unit using a lithium ion can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables a charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, As, Sb, Bi, Ag, Au, Zn, Cd, Hg, In, and the like. Such elements have higher capacity than carbon. In particular, silicon has a theoretical capacity of 4200 mAh/g, which is significantly high. For this reason, silicon is preferably used as the negative electrode active material. Examples of the alloy-based material using such elements include Mg$_2$Si, Mg$_2$Ge, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like.

Alternatively, as the negative electrode active material layer 102b, oxide such as SiO, SnO, SnO$_2$, titanium dioxide (TiO$_2$), lithium titanium oxide (Li$_4$Ti$_5$O$_{12}$), lithium-graphite intercalation compound (Li$_x$C$_6$), niobium pentoxide (Nb$_2$O$_5$), tungsten oxide (WO$_2$), molybdenum oxide (MoO$_2$), or the like can be used.

Note that SiO refers to the powder of a silicon oxide including a silicon-rich portion and can also be referred to as SiO$_y$ (2>y>0). Examples of SiO include a material containing one or more of Si$_2$O$_3$, Si$_3$O$_4$, and Si$_2$O and a mixture of Si powder and silicon dioxide (SiO$_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, Si$_2$O$_3$, Si$_3$O$_4$, Si$_2$O, and SiO$_2$. Thus, SiO can be distinguished from SiO$_x$ (x is 2 or more), which is clear and colorless or white. Note that in the case where a secondary battery is fabricated using SiO as a material thereof and the SiO is oxidized because of repeated charge and discharge cycles, SiO is changed into SiO$_2$ in some cases.

Still alternatively, Li$_{3-x}$M$_x$N (M=Co, Ni, or Cu) with a Li$_3$N structure, which is a nitride containing lithium and a transition metal, can be used as the negative electrode active material 6103. For example, Li$_{2.6}$Co$_{0.4}$N$_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as V$_2$O$_5$ or Cr$_3$O$_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material 6103. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as Fe$_2$O$_3$, CuO, Cu$_2$O, RuO$_2$, and Cr$_2$O$_3$, sulfides such as CoS$_{0.89}$, NiS, or CuS, nitrides such as Zn$_3$N$_2$, Cu$_3$N, and Ge$_3$N$_4$, phosphides such as NiP$_2$, FeP$_2$, and CoP$_3$, and fluorides such as FeF$_3$ and BiF$_3$. Note that any of the fluorides can be used as a positive electrode active material.

In the case where the negative electrode active material layer 102b is formed on the negative electrode current collector 102a by a coating method, the negative electrode active material 6103 and the binder 6105 are mixed to form a negative electrode paste (slurry), and the negative electrode paste is applied to the negative electrode current collector 102a and dried. Note that a conductive additive may be added to the negative electrode paste.

Graphene may be formed on a surface of the negative electrode active material layer 102b. For example, in the case of using silicon as the negative electrode active material 6103, the volume of silicon is greatly changed due to occlusion and release of carrier ions in charge-discharge cycles. Thus, adhesion between the negative electrode current collector 102a and the negative electrode active material layer 102b is decreased, resulting in degradation of battery characteristics caused by charge and discharge. In view of this, graphene is preferably formed on a surface of the negative electrode active material layer 102b containing silicon because even when the volume of silicon is changed in charge-discharge cycles, decrease in the adhesion between the negative electrode current collector 102a and the negative electrode active material layer 102b can be inhibited, which makes it possible to reduce degradation of battery characteristics.

Further, a coating film of oxide or the like may be formed on the surface of the negative electrode active material layer 102b. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 102b in advance can reduce or prevent generation of irreversible capacity.

As the coating film coating the negative electrode active material layer 102b, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide (Nb$_2$O$_5$) has a low electric conductivity of 10$^{-9}$ S/cm and a high insulating property.

For this reason, a niobium oxide film inhibits an electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 102b with the coating film, for example. The sol-gel method is a method for forming a thin film in such a manner that a solution of metal alkoxide, a metal salt, or the like is changed into a gel, which has lost its fluidity, by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 102b. A decrease in the capacity of the power storage unit can be prevented by using the coating film.

[2.1. Connecting Lead Electrode to Negative Electrode]

After the negative electrode active material layer 102b is formed on the negative electrode current collector 102a, the negative electrode lead 105 provided with the sealing layer 115 is connected to a negative electrode tab of the negative electrode current collector 102a. The negative electrode tab and the negative electrode lead 105 are connected like the positive electrode tab and the positive electrode lead 104.

[3. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used.

Alternatively, nonwoven fabric of a glass fiber or the like, or a diaphragm in which a glass fiber and a polymer fiber are mixed may be used.

Figure 14A:
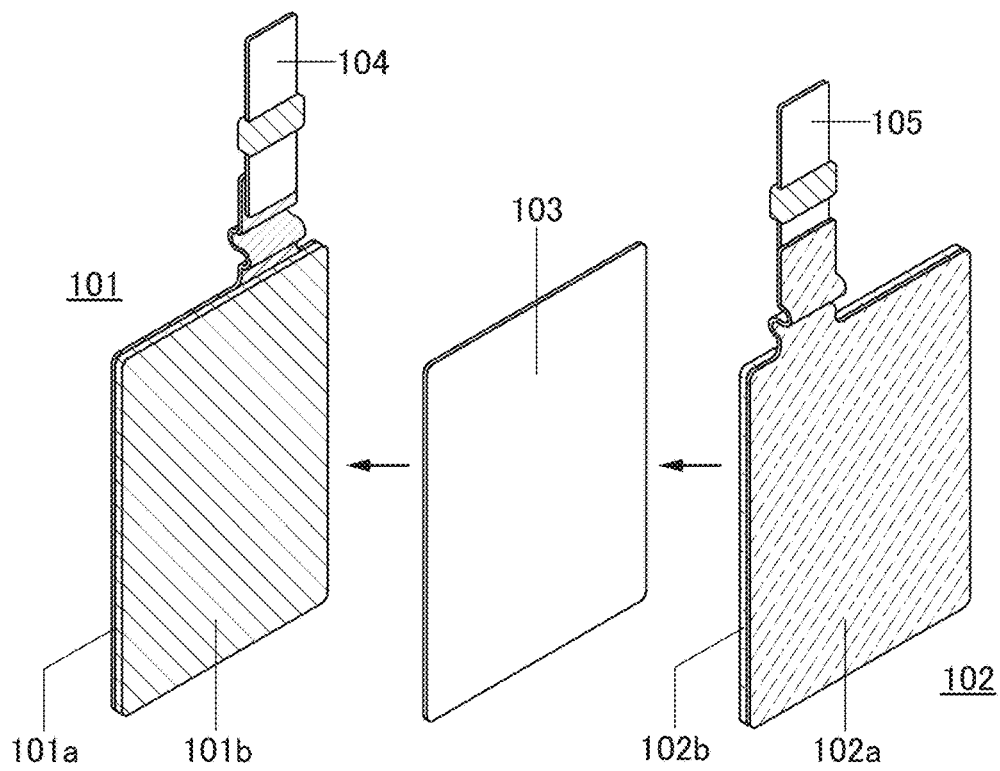
FIGS. 14A to 14C illustrate an example of a method for manufacturing a power storage unit.

The positive electrode 101, the negative electrode 102, and the separator 103 overlap so that the separator 103 is interposed between the positive electrode 101 and the negative electrode 102. Here, the positive electrode active material layer 101b and the negative electrode active material layer 102b overlap so as to face each other. In FIG. 14A, the plate-shaped separator 103 is interposed between the positive electrode 101 and the negative electrode 102, in which the positive electrode active material layer 101b is formed on one side of the positive electrode current collector 101a in the positive electrode 101 and the negative electrode active material layer 102b is formed on one surface of the negative electrode current collector 102a in the negative electrode 102. Note that the positive electrode lead 104 and the negative electrode lead 105 are placed in different positions so as not to overlap with each other.

In addition, the separator 103 preferably has a size such that it can completely cover at least one of the positive electrode active material layer 101b and the negative electrode active material layer 102b.

Figure 14B:
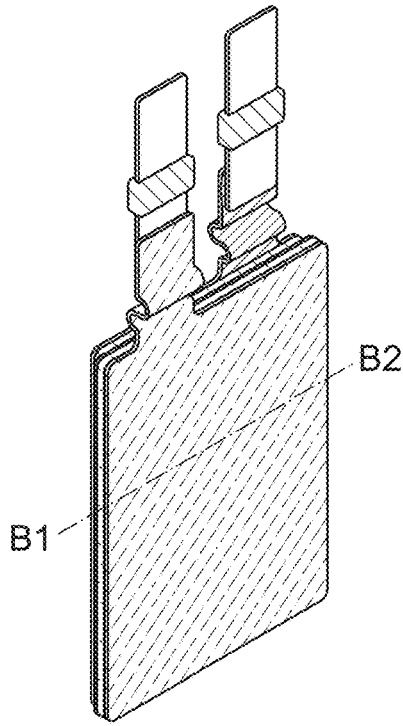
Figure 14C:
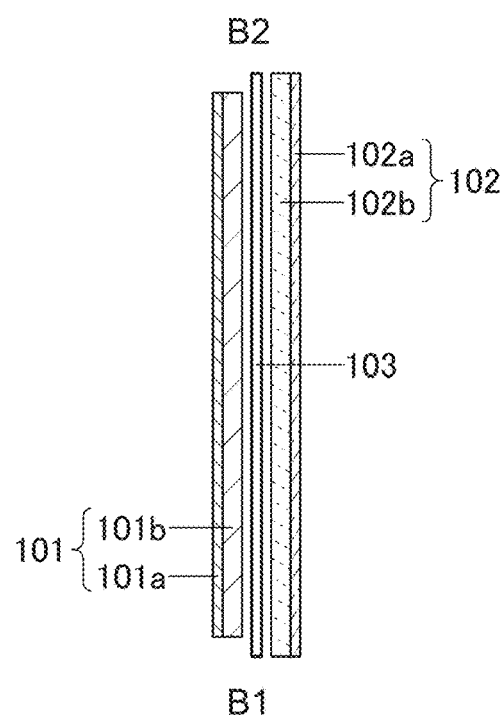

FIG. 14B is a perspective view in which the positive electrode 101, the negative electrode 102, and the separator 103 overlap with each other. FIG. 14C is a cross-sectional view taken along the dashed-dotted line B1-B2 in FIG. 14B. The negative electrode 102 larger than the positive electrode 101 is overlapped here, but the negative electrode 102 smaller than the positive electrode 101 may be overlapped. Alternatively, the positive electrode 101 and the negative electrode 102 having the same size may overlap with each other.

Figure 15A:
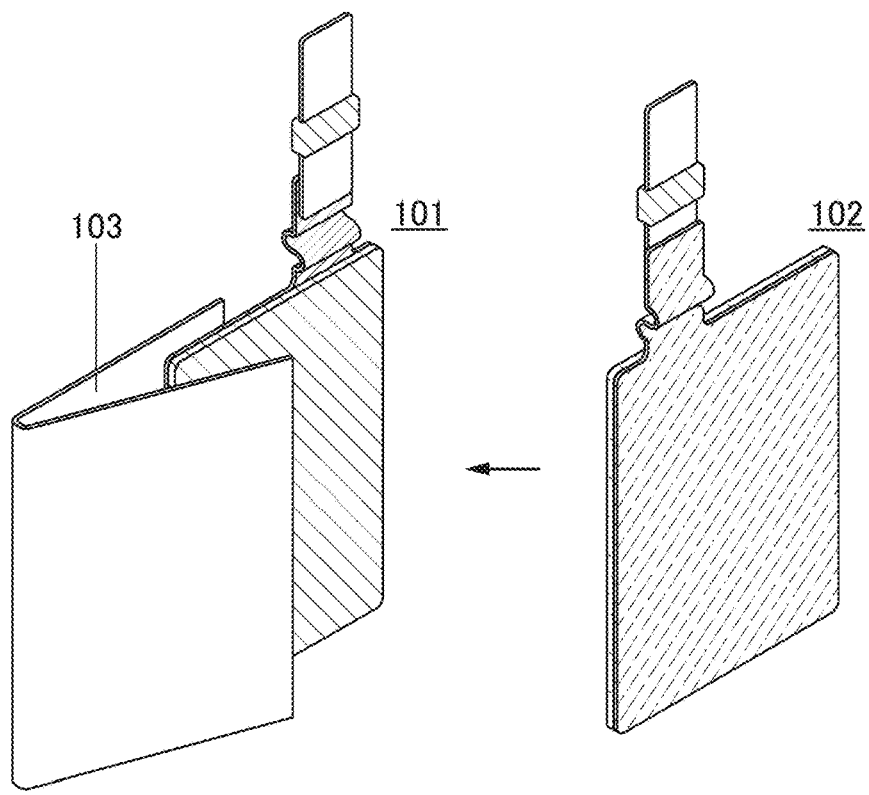
FIGS. 15A to 15C illustrate an example of a method for manufacturing a power storage unit.

The shape of the separator 103 is not limited to a sheet shape. For example, the separator 103 which is folded double may be used, in which case one or both of the positive electrode 101 and the negative electrode 102 may be placed inside the double-folded separator 103. In FIG. 15A, the positive electrode 101 is placed inside the double-folded separator 103 and then overlaps with the negative electrode 102.

Figure 15B:
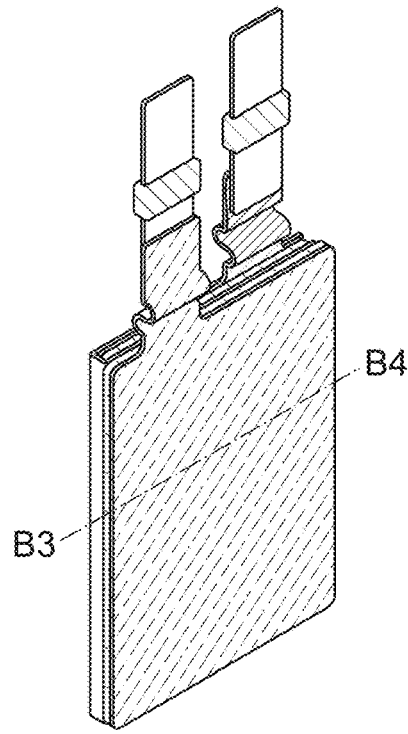
Figure 15C:
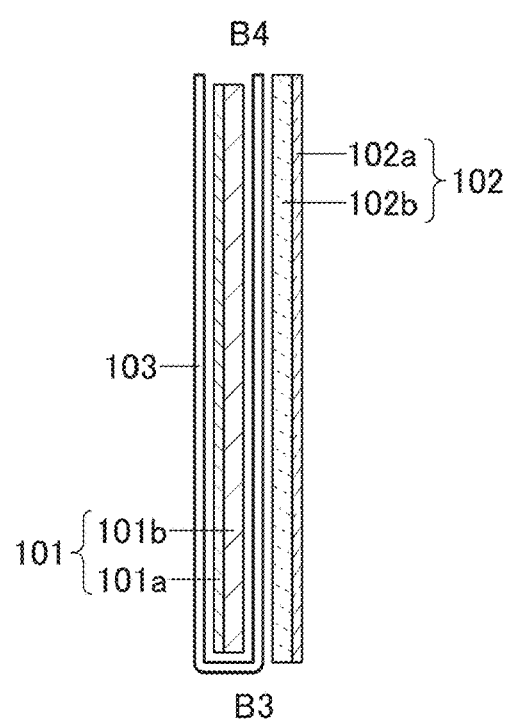

FIG. 15B is a perspective view in which the positive electrode 101 placed inside the double-folded separator 103 and the negative electrode 102 overlap with each other. FIG. 15C is a cross-sectional view taken along the dashed-dotted line B3-B4 in FIG. 15B. Although the positive electrode 101 and the negative electrode 102 having the same size overlap here, they may have different sizes. The double-folded separator 103 can be used for one or both of the positive electrode 101 and the negative electrode 102.

Figure 16:
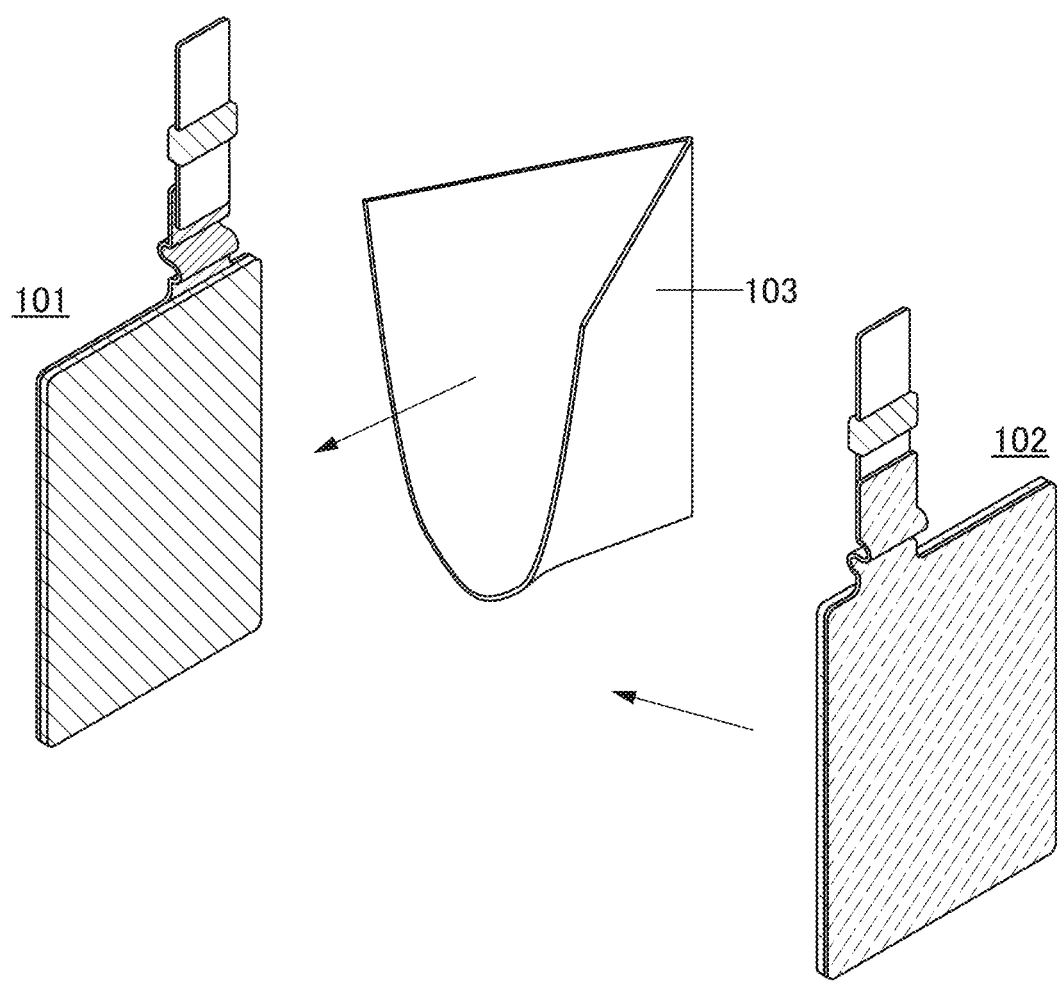
FIG. 16 illustrates an example of a method for manufacturing a power storage unit.

Alternatively, the separator 103 having a bag shape may be used, in which case one or both of the positive electrode 101 and the negative electrode 102 are placed inside the bag-shaped separator 103. In FIG. 16, the positive electrode 101 is placed inside the bag-shaped separator 103 and then overlaps with the negative electrode 102. Alternatively, the separator 103 may have an envelope shape.

A double-folded, bag-shaped, or envelope-shaped separator can increase the productivity of the power storage unit when the number of the electrodes including the positive electrode 101 and the negative electrode 102 used in the power storage unit is three or more.

Figure 17A:
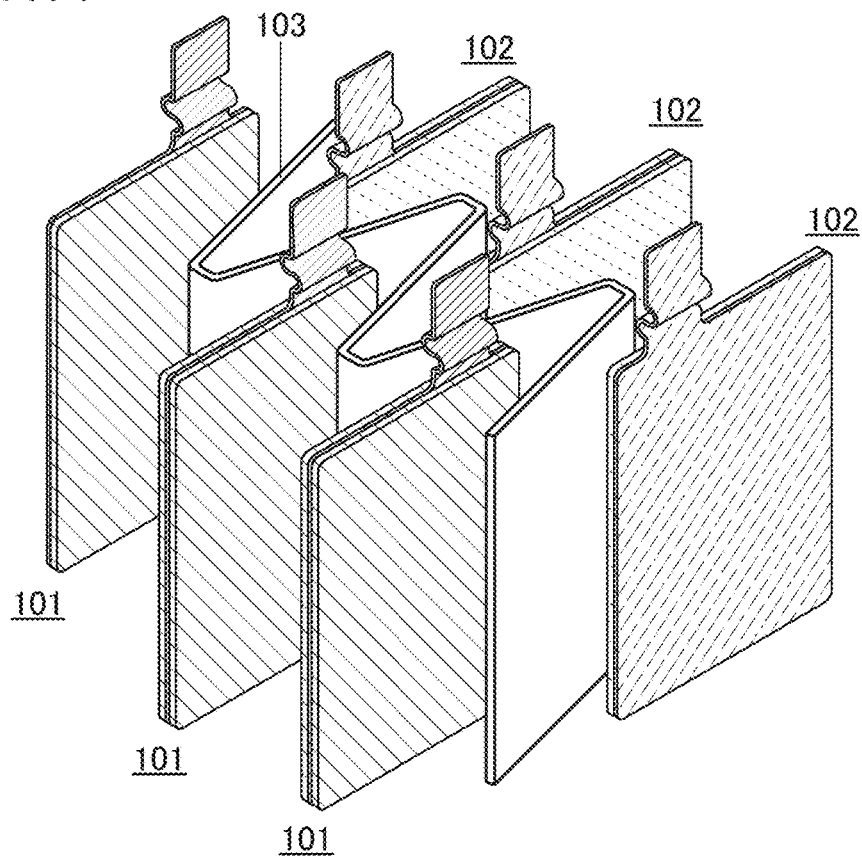
FIGS. 17A to 17C illustrate an example of a method for manufacturing a power storage unit.

Furthermore, when the number of the electrodes used in the power storage unit is three or more, use of a separator bent in a wave (zigzag) shape is particularly effective. FIG. 17A is a perspective view in which the positive electrodes 101 and the negative electrodes 102 alternately overlap with each other with the separator 103 bent in a wave shape interposed therebetween. In FIG. 17A, the positive electrodes 101 and the negative electrodes 102, in each of which an active material layer is formed on each surface of a current collector, are placed between the positive electrode 101 and the negative electrode 102, in each of which an active material layer is formed on one surface of a current collector.

Figure 17B:
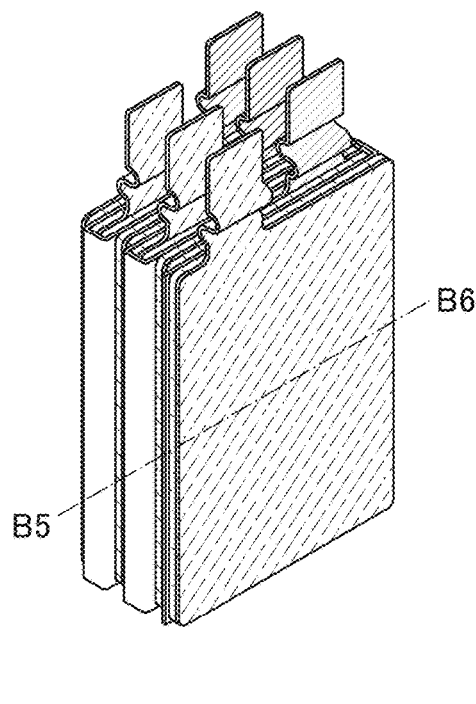
Figure 17C:
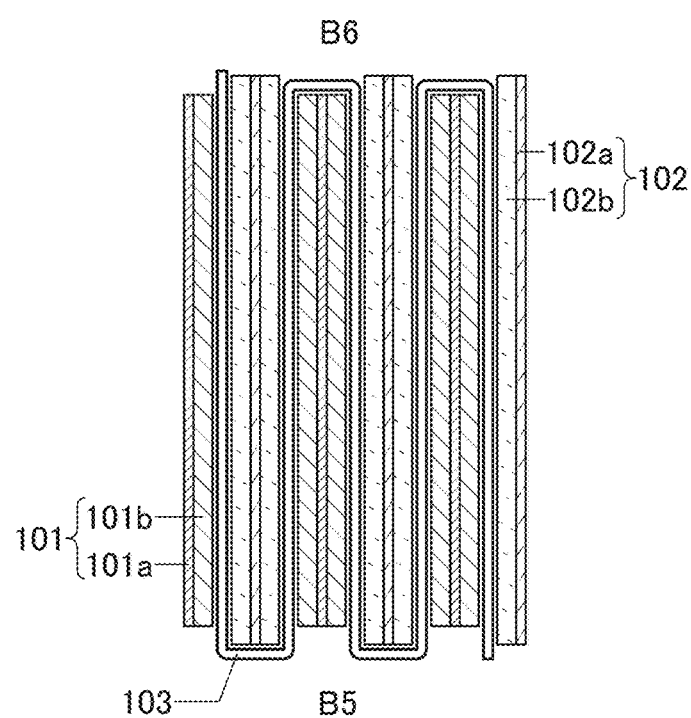

FIG. 17B is a perspective view in which a plurality of positive electrodes 101 and a plurality of negative electrodes 102 overlap with each other with the separator 103 bent in a wave shape interposed therebetween. FIG. 17C is a cross-sectional view taken along the dashed-dotted line B5-B6 in FIG. 17B.

Figure 18A:
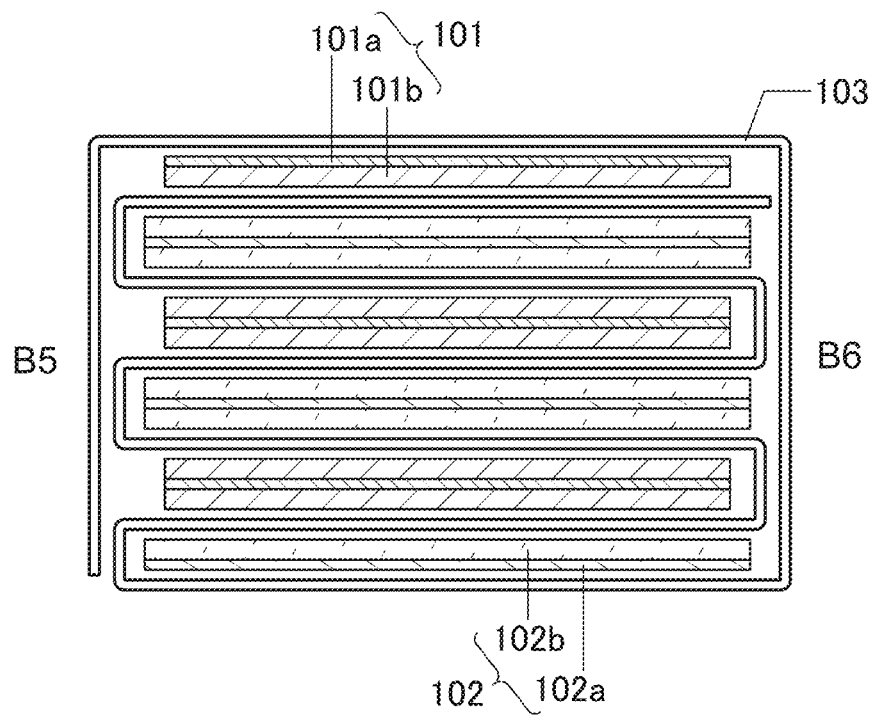
FIGS. 18A and 18B illustrate examples of a method for manufacturing a power storage unit.
Figure 18B:
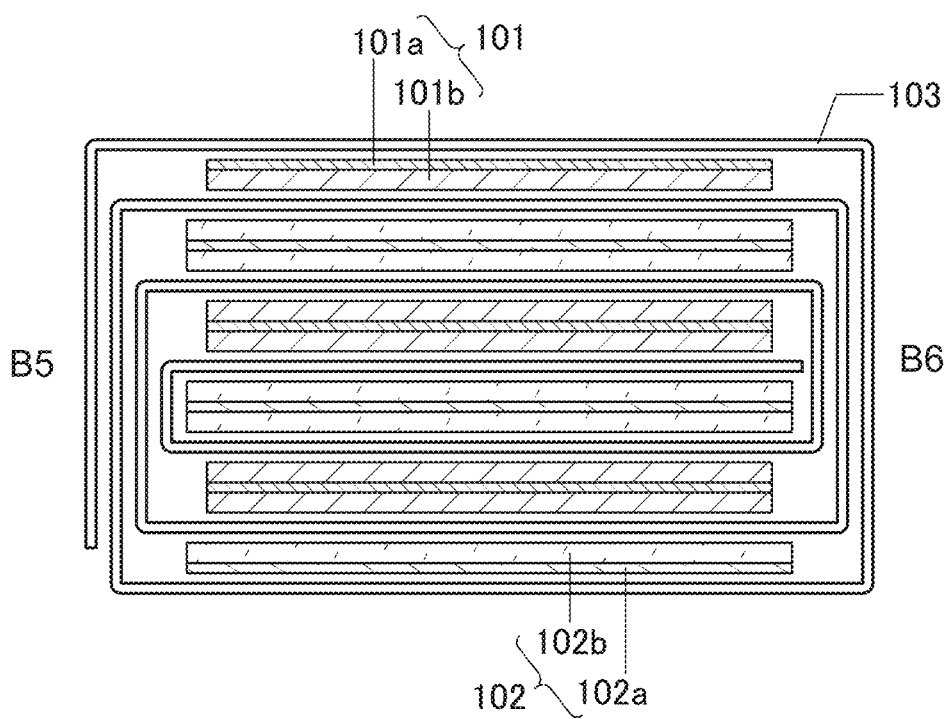

As illustrated in the cross-sectional view of FIG. 18A, the outside of the positive electrodes 101 and the negative electrodes 102 which overlap with each other with the separator 103 interposed therebetween may be wrapped with the separator 103. Furthermore, as illustrated in the cross-sectional view of FIG. 18B, the positive electrodes 101 and the negative electrodes 102 may overlap with each other with the separator 103 wound. Note that FIGS. 18A and 18B are cross-sectional views each taken along the dashed-dotted line B5-B6 in FIG. 17B.

The separator bent in a wave shape can further increase the productivity of the power storage unit when the total number of the positive electrode 101 and the negative electrode 102 used in the power storage unit is three or more.

When a plurality of separators 103 is used in the power storage unit 100, all the separators 103 may contain the same material or the separators 103 containing different materials may be combined. Furthermore, when a plurality of separators 103 is used in the power storage unit 100, all the separators 103 may have the same shape or the separators 103 having different shapes may be combined.

Figure 19A:
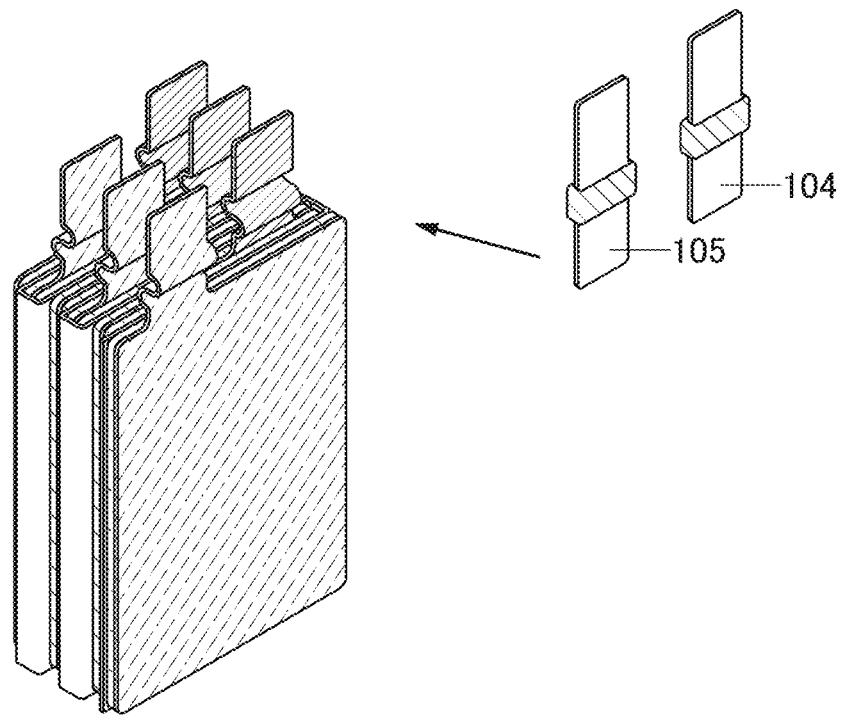
FIGS. 19A and 19B illustrate an example of a method for connecting a lead terminal to a plurality of positive electrodes or a plurality of negative electrodes.
Figure 19B:
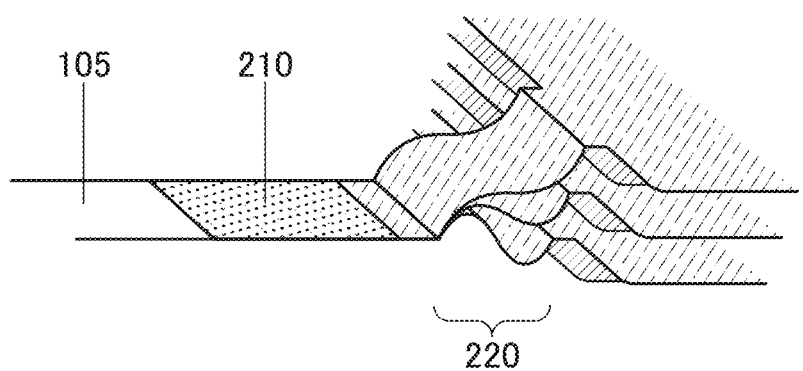

When a power storage unit including a plurality of positive electrodes 101 and a plurality of negative electrodes 102 is fabricated, it is preferable that, after overlap of the positive electrodes 101, the separator 103, and the negative electrodes 102, a plurality of positive electrode tabs be collectively connected to one positive electrode lead 104 (see FIG. 19A). It is also preferable that the negative electrode tabs be collectively connected to one negative electrode lead 105. The connection between the positive electrode tabs and the positive electrode lead 104 and the connection between the negative electrode tabs and the negative electrode lead 105 can be performed using the ultrasonic welding apparatus including the bonding dies as described above. FIG. 19B is a perspective view in which the connection region 210 and the bend portion 220 of the negative electrode tab are enlarged. By collectively connecting the plurality of positive electrode tabs to one positive electrode lead 104 and connecting the plurality of negative electrode tabs to one negative electrode lead 105, productivity of the power storage unit can be increased.

[4. Exterior Body]

The secondary battery can have any of a variety of structures, and a sheet-like member is used for the exterior body 107 in this embodiment. For example, a film is used for the exterior body 107. Note that the film used for the exterior body 107 is a single-layer film selected from a metal film (e.g., an aluminum film, a stainless steel film, and a nickel steel film), a plastic film (thermoplastic film) made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films.

As the exterior body 107, for example, one metal sheet or a film whose both surfaces are covered with a resin layer may be used. For example, a film having a three-layer structure can be used in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film A metal film is easy to process to form projections and depressions. In addition, a metal film can achieve efficient heat dissipation. Formation of depressions or projections on the exterior body 107 increases the surface area of the exterior body 107 which is exposed to outside air, leading to more efficient heat dissipation.

In the case where the power storage unit 100 is changed in shape by externally applied force, the exterior body 107 might partly be deformed or damaged. The exterior body 107 having depressions or projections can relieve a strain caused by stress applied to the exterior body 107 and increase the bending strength. Furthermore, the exterior body becomes less likely to be broken even when repeatedly bent or stretched. Thus, the power storage unit 100 can be highly reliable. Note that a "strain" is the scale of change in form indicating the displacement of a point of an object relative to the reference (initial) length of the object. The exterior body 107 having depressions or projections can reduce the influence of a strain caused by application of external force to the power storage unit to an acceptable level. Thus, the power storage unit with high reliability can be provided.

Figure 20A:
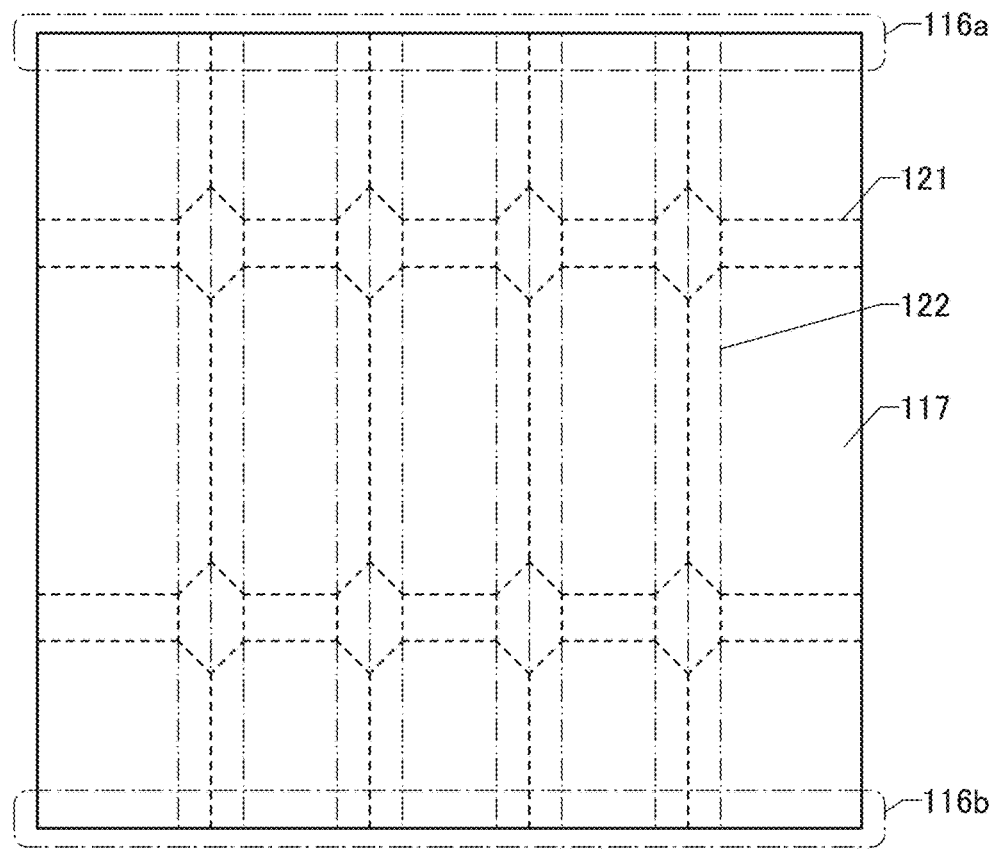
FIGS. 20A to 20C illustrate an example of a method for manufacturing an exterior body.

A film 117 illustrated in FIG. 20A is bent so as to form the exterior body 107 of the power storage unit 100. A dashed line 121 on the film 117 indicates a portion to be a ridgeline on the exterior body 107 later. A dashed double-dotted line 122 on the film 117 indicates a portion to be a valley line on the exterior body 107 later.

Figure 20B:
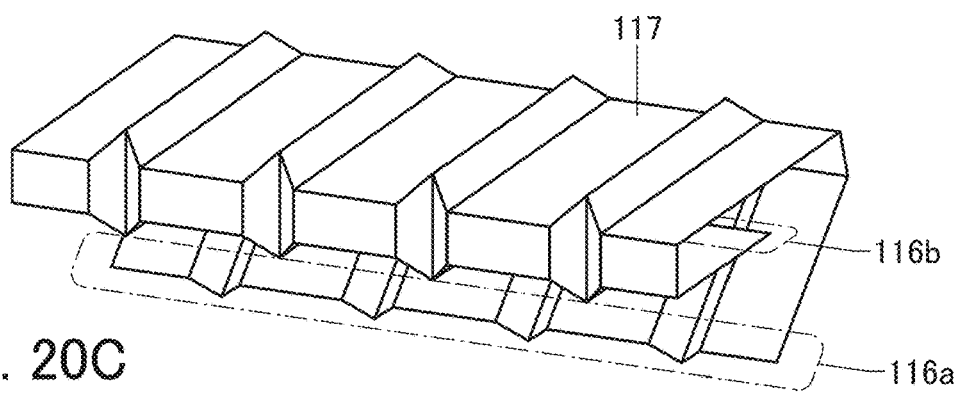
Figure 20C:
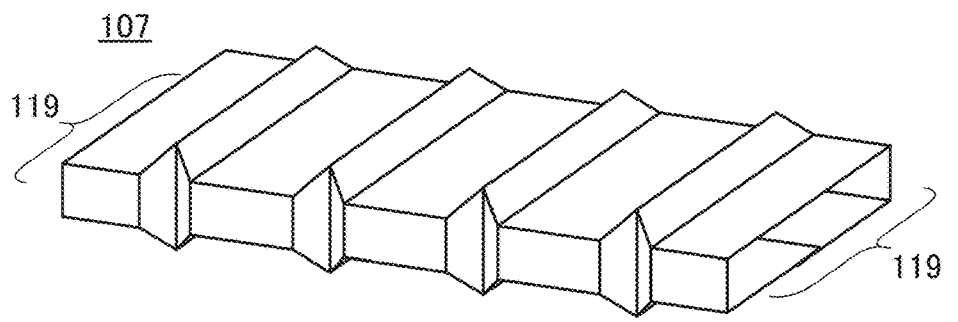

First, the film 117 is mountain-folded along the line 121 and valley-folded along the line 122 to be bent (see FIG. 20B); then, end portions 116a and 116b of the film 117 are overlapped with each other (see FIG. 20C). Next, the overlapped end portions 116a and 116b are connected by thermocompression bonding, whereby the tubular exterior body 107 having two openings 119 can be formed.

Figure 21A:
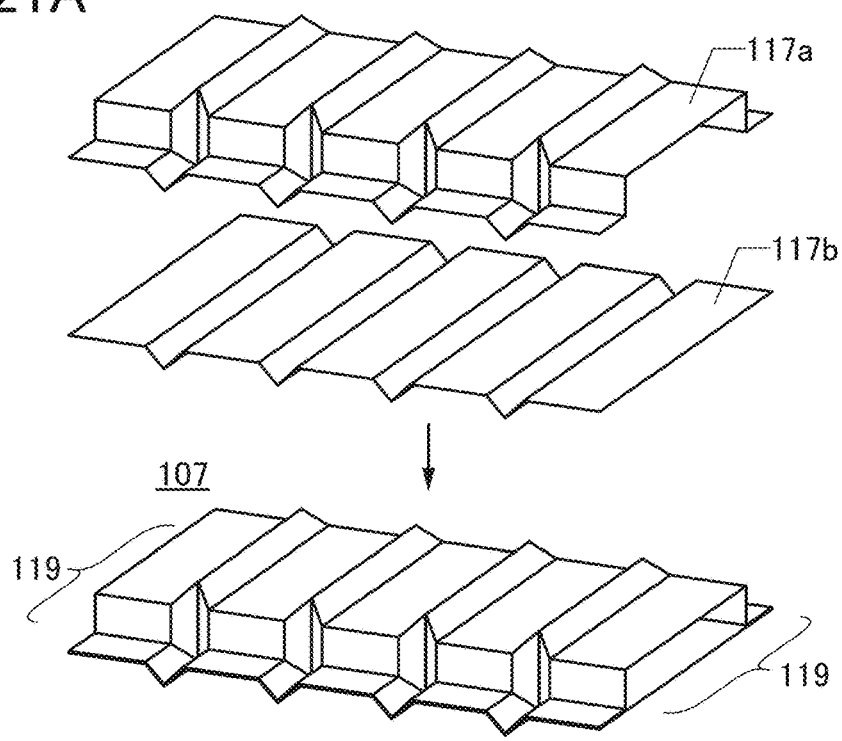
FIGS. 21A and 21B illustrate examples of an exterior body.
Figure 21B:
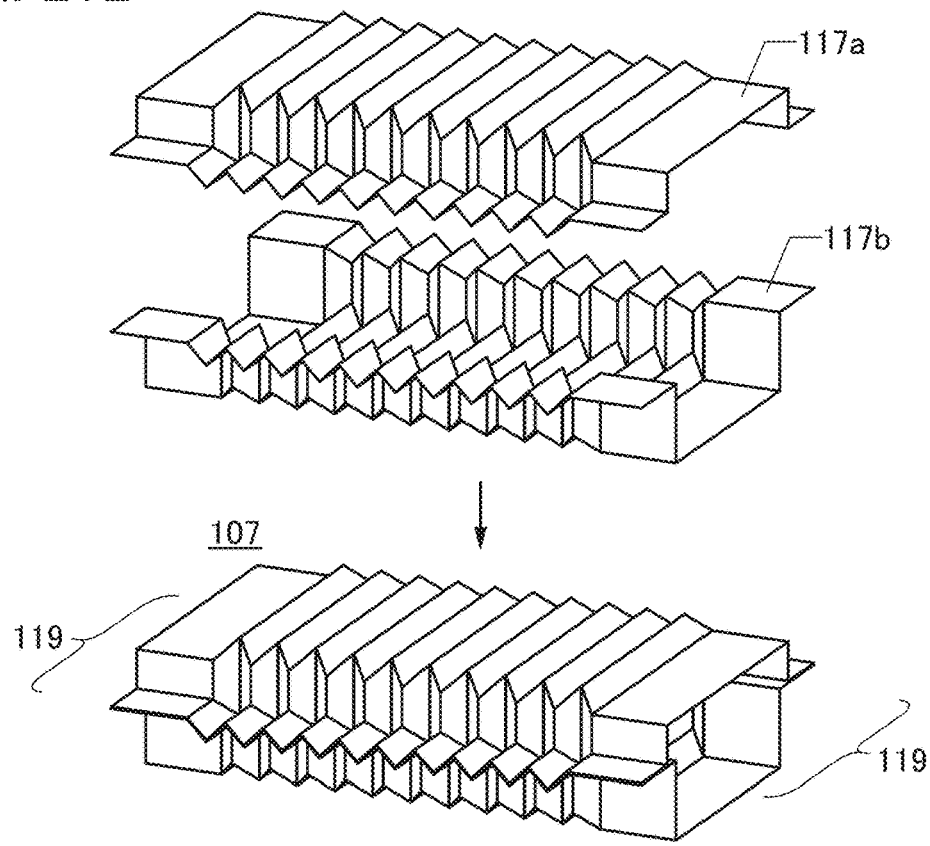

Note that the tubular exterior body 107 can also be formed by combining the bent films 117a and 117b as illustrated in FIGS. 21A and 21B.

Figure 22:
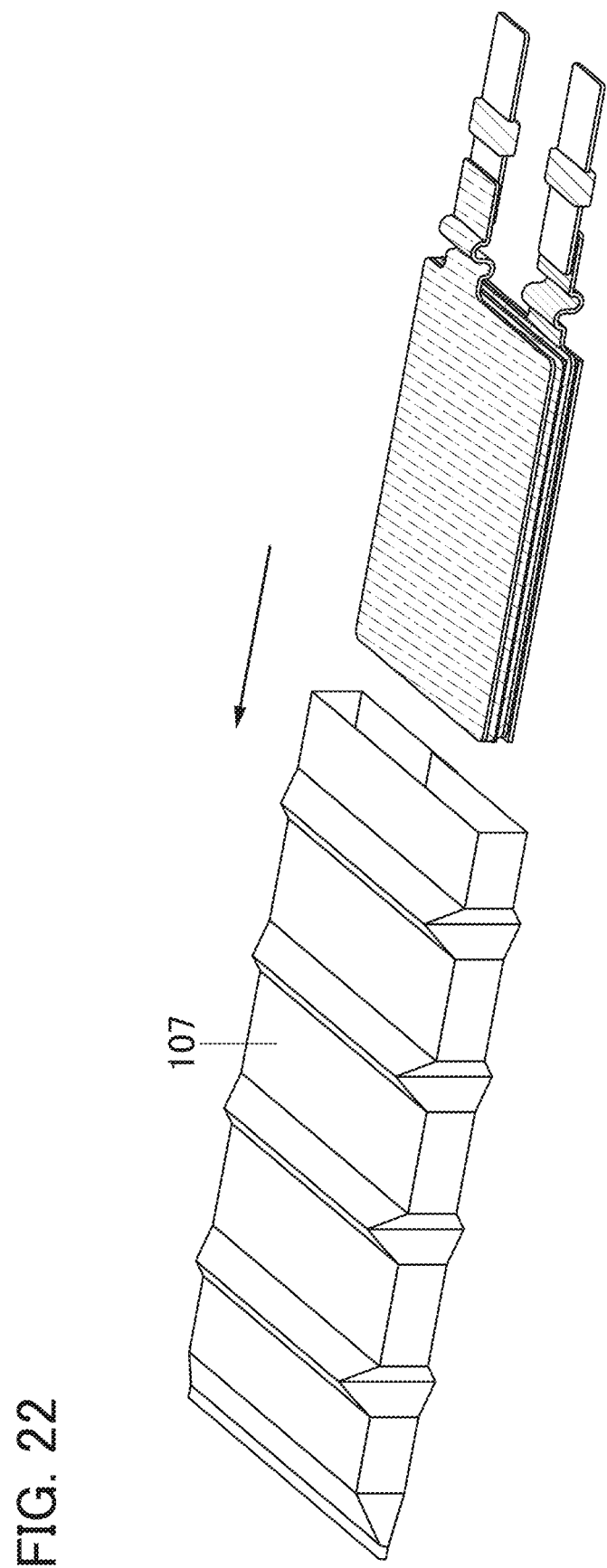
FIG. 22 illustrates an example of a method for manufacturing a power storage unit.

Next, one of the openings 119 of the tubular exterior body 107 is closed and sealed by thermocompression bonding. Then, the positive electrodes 101, the separator 103, and the negative electrodes 102 are put inside the exterior body 107 through the other of the openings 119 (see FIG. 22).

[5. Electrolyte Solution]

Next, in a reduced-pressure atmosphere or an inert gas atmosphere, a desired amount of the electrolyte solution 106 is put in the exterior body 107 through the other of the openings 119.

As a solvent of the electrolyte solution 106, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution 106, safety against liquid leakage and the like is improved. Further, the secondary battery can be thinner and more lightweight. Typical examples of the gelled high-molecular material include a silicone gel, an acrylic gel, an acrylonitrile gel, a polyethylene oxide gel, a polypropylene oxide gel, a fluorine-based polymer, and the like.

Alternatively, the use of one or more ionic liquids (room temperature molten salts) which are less likely to burn and volatilize as the solvent of the electrolyte solution can prevent the power storage unit from exploding or catching fire even when the power storage unit internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolyte solution used for the power storage unit preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

Finally, the other of the openings 119 is sealed by thermocompression bonding. In the above-described manner, the power storage unit 100 can be fabricated. According to one embodiment of the present invention, the exterior body 107 having the projections 108 and the depressions 109 can be formed by bending the film 117. Accordingly, the exterior body 107 having the projections 108 and the depressions 109 can be obtained without any special processing apparatus or any special method. According to one embodiment of the present invention, productivity of the power storage unit 100 having flexibility can be increased.

This embodiment can be implemented in appropriate combination with any of the structures described in the other embodiments.

Embodiment 2

A battery management unit (BMU) that can be used in combination with secondary batteries each including the materials described in the above embodiment and transistors that are suitable for a circuit included in the battery management unit will be described with reference to FIG. 23, FIGS. 24A to 24C, FIG. 25, FIG. 26, FIGS. 27A to 27C, FIG. 28, and FIG. 29. In this embodiment, in particular, a battery management unit of a power storage device including battery cells connected in series will be described.

When a plurality of battery cells connected in series is charged and discharged repeatedly, each battery cell has different capacity (output voltage) from one another due to the variation in characteristics among the battery cells. A discharge capacity of all of the plurality of battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharging. Although circuit structures for reducing variation in capacities among the battery cells include a resistive type, a capacitor type, and an inductor type, here, a circuit structure which can reduce variation in capacities among the battery cells using transistors with a low off-state current is explained as an example.

As an example of the transistor with a low off-state current, a transistor including an oxide semiconductor in its channel formation region (an OS transistor) is preferably used. When an OS transistor with a small off-state current is used in the circuit of the battery management unit of the power storage device, the amount of charge leaking from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is $In:M:Zn=x_1:y_1:z_1$, $x_1/y_1$ is preferably greater than or equal to $\frac{1}{3}$ and less than or equal to 6, further preferably greater than or equal to 1 and less than or equal to 6, and $z_1/y_1$ is preferably greater than or equal to $\frac{1}{3}$ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to a sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the high-resolution planar TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS film including an $InGaZnO_4$ crystal is analyzed by an out-of-plane method using an X-ray diffraction (XRD) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released, and might behave like fixed charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 23:
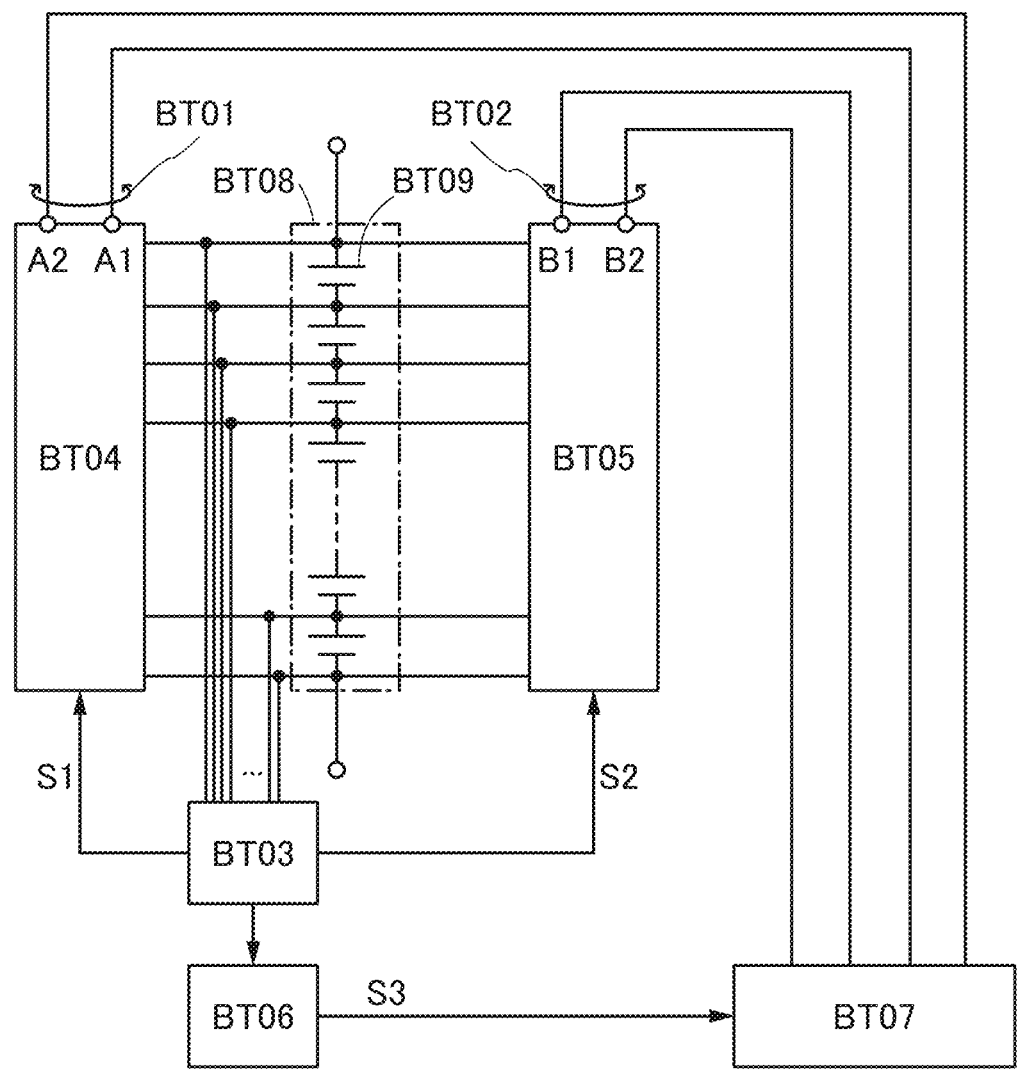
FIG. 23 is a block diagram illustrating a battery management unit of a power storage device.

FIG. 23 is an example of a block diagram of the power storage device. A power storage device BT00 illustrated in FIG. 23 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 23, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having a highest voltage or a lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of consecutive high-voltage cells connected in series as the discharge battery cell group of mixed high-voltage cells and low-voltage cells. Furthermore, the switching control circuit BT03 selects a portion having the largest number of consecutive low-voltage cells connected in series as the charge battery cell group. In addition, the switching control circuit BT03 may preferentially select the battery cells BT09 which are almost overcharged or overdischarged as the discharge battery cell group or the charge battery cell group.

Figure 24A:
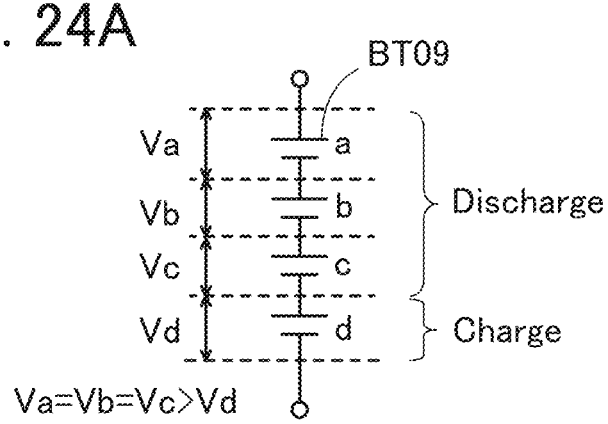
FIGS. 24A to 24C are conceptual diagrams each illustrating a battery management unit of a power storage device.
Figure 24B:
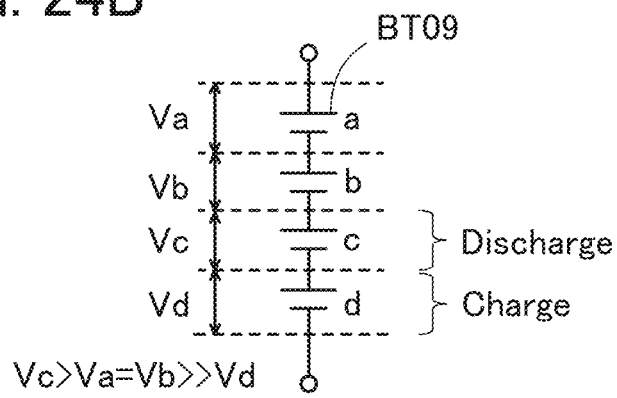
Figure 24C:
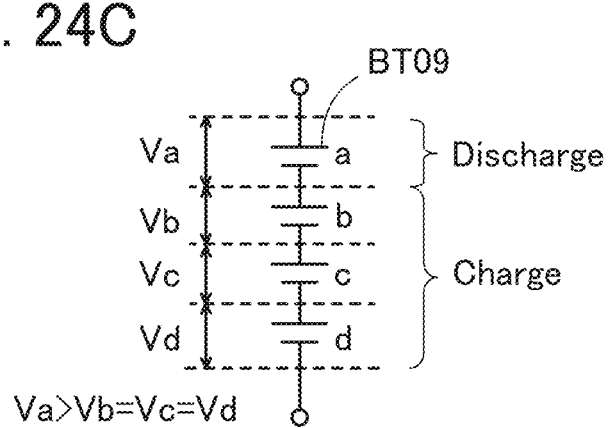

Here, operation examples of the switching control circuit BT03 in this embodiment will be described with reference to FIGS. 24A to 24C. FIGS. 24A to 24C illustrate the operation examples of the switching control circuit BT03. Note that FIGS. 24A to 24C each illustrate the case where four battery cells BT09 are connected in series as an example for convenience of explanation.

FIG. 24A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, three consecutive high-voltage cells a to c and one low-voltage cell d are connected in series. In this case, the switching control circuit BT03 selects the three consecutive high-voltage cells a to c as the discharge battery cell group.

In addition, the switching control circuit BT03 selects the low-voltage cell d as the charge battery cell group.

Next, FIG. 24B shows the case where the relation of the voltages is Vc>Va=Vb>>Vd. That is, a series of two low-voltage cells a and b, one high-voltage cell c, and one low-voltage cell d which is almost overdischarged are connected in series. In this case, the switching control circuit BT03 selects the high-voltage cell c as the discharge battery cell group. Since the low-voltage cell d is almost overdischarged, the switching control circuit BT03 preferentially selects the low-voltage cell d as the charge battery cell group instead of the series of two low-voltage cells a and b.

Lastly, FIG. 24C shows the case where the relation of the voltages is Va>Vb=Vc=Vd. That is, one high-voltage cell a and three consecutive low-voltage cells b to d are connected in series. In this case, the switching control circuit BT03 selects the high-voltage cell a as the discharge battery cell group. In addition, the switching control circuit BT03 selects the three consecutive low-voltage cells b to d as the charge battery cell group.

On the basis of the determination result shown in the examples of FIGS. 24A to 24C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05, is set in the control signal S2.

The above is the detailed description of the operations of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting connects one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 25:
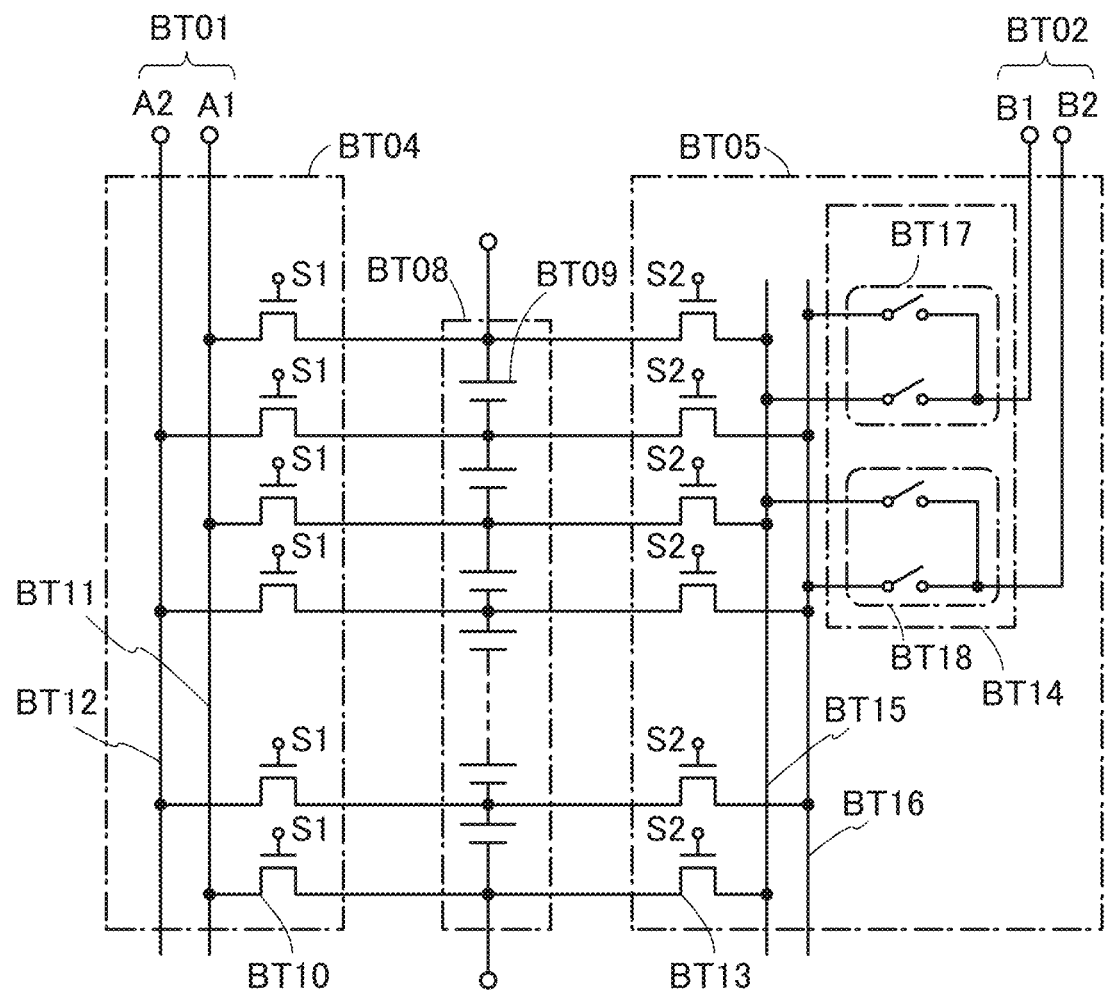
FIG. 25 is a circuit diagram illustrating a battery management unit of a power storage device.
Figure 26:
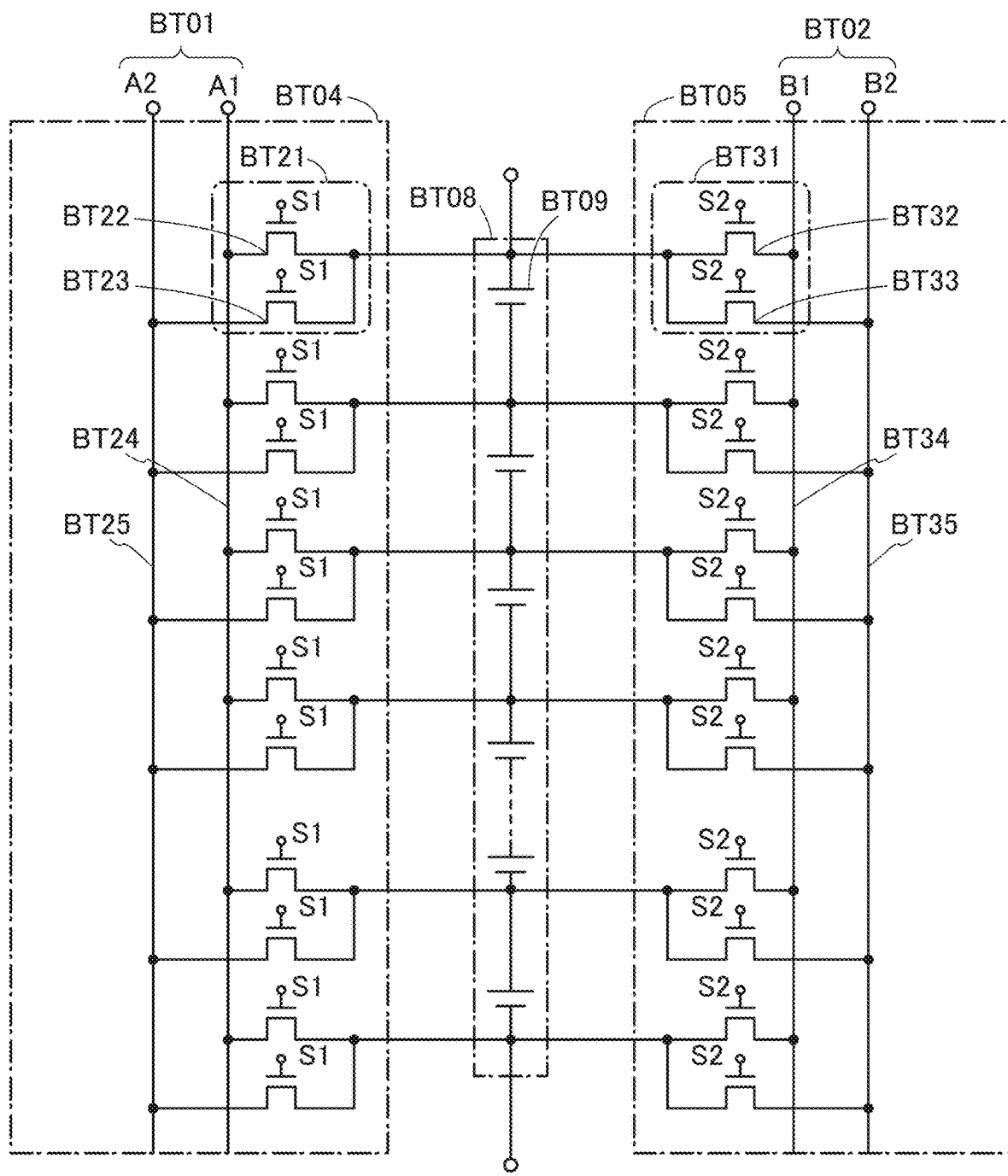
FIG. 26 is a circuit diagram illustrating a battery management unit of a power storage device.

FIG. 25 and FIG. 26 are circuit diagrams showing structure examples of the switching circuits BT04 and BT05.

In FIG. 25, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 or the bus BT12 of the plurality of transistors BT10 are each connected between two adjacent battery cells BT09.

The source or drain of the transistor BT10 which is not connected to the bus BT11 on the most upstream side of the plurality of transistors BT10 is connected to the positive electrode terminal of the battery cell BT09 on the most upstream side of the battery portion BT08. The source or drain of the transistor BT10 which is not connected to the bus BT11 of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 connected to the bus BT11 and one of the plurality of transistors BT10 connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 25, the switching circuit BT05 includes a plurality of transistors BT13, a current control switch BT14, a bus BT15, and a bus BT16. The bus BT15 and the bus BT16 are provided between the plurality of transistor BT13 and the current control switch BT14. Sources or drains of the plurality of transistors BT13 are connected alternately to the bus BT15 and the bus BT16. Sources or drains which are not connected to the bus BT15 or the bus BT16 of the plurality of transistors BT13 are each connected between two adjacent battery cells BT09.

The source or drain of the transistor BT13 which is not connected to the bus BT15 on the most upstream side of the plurality of transistors BT13 is connected to the positive electrode terminal of the battery cell BT09 on the most upstream side of the battery portion BT08. A source or drain of the transistor BT13 which is not connected to the bus BT15 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. The switch pair BT17 includes two switches. Terminals on one end of the switch pair BT17 are connected to the terminal B1. A terminal of a switch on the other end of the switch pair BT17 is connected to the bus BT15, and a terminal of the other switch on the other end of the switch pair BT 17 is connected to the bus BT16. The switch pair BT 18 includes two switches. Terminals on one end of the switch pair BT 18 are connected to the terminal B2. A terminal of a switch on the other end of the switch pair BT 18 is connected to the bus BT15, and a terminal of the other switch on the other end of the switch pair BT 18 is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the structures of the voltage transformer circuit BT07 and the discharge battery cell group connected to the terminal pair BT01. In order to supply current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 26 is a circuit diagram illustrating structure examples of the switching circuit BT04 and the switching circuit BT05 which are different from those of FIG. 25.

In FIG. 26, the switching circuit BT04 includes a plurality of transistor pairs BT21, a bus BT24, and a bus BT25. The bus BT24 is connected to the terminal A1. The bus BT25 is connected to the terminal A2. Each of the transistor pairs BT21 includes a transistor BT22 and a transistor BT23. One of a source and a drain of the transistor BT22 is connected to the bus BT24. One of a source and a drain of the transistor BT23 is connected to the bus BT25. The other of the source and the drain of the transistor BT22 and the other of the source and the drain of the transistor BT23 are connected to one end of the transistor pair BT21.

One end of the transistor pair BT21 on the most upstream side of the plurality of transistor pairs BT21 is connected to the positive electrode terminal of the battery cell BT09 on the most upstream side of the battery portion BT08. One end of the transistor pair BT21 on the most downstream side of the plurality of transistor pairs BT21 is connected to a negative electrode terminal of the battery cell BT09 on the most downstream side of the battery portion BT08. Terminals on one end of the other transistor pairs BT21 are each connected between two adjacent battery cells BT09. Note that a plurality of terminals on one end of the other transistor pairs BT21 is not connected between two adjacent battery cells BT09.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. Each of the transistor pairs BT31 includes a transistor BT32 and a transistor BT33. One of a source and a drain of the transistor BT32 is connected to the bus BT34. One of a source and a drain of the transistor BT33 is connected to the bus BT35. The other of the source and the drain of the transistor BT32 and the other of the source and the drain of the transistor BT33 are connected to one end of the transistor pair BT31.

One end of the transistor pair BT31 on the most upstream side of the plurality of transistor pairs BT31 is connected to the positive electrode terminal of the battery cell BT09 on the most upstream side of the battery portion BT08. One end of the transistor pair BT31 on the most downstream side of the plurality of transistor pairs BT31 is connected to the negative electrode terminal of the battery cell BT09 on the most downstream side of the battery portion BT08. Terminals on one end of the other transistor pairs BT21 are each connected between two adjacent battery cells BT09. Note that a plurality of terminals on one end of the other transistor pairs BT21 is not connected between two adjacent battery cells BT09.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 27A:
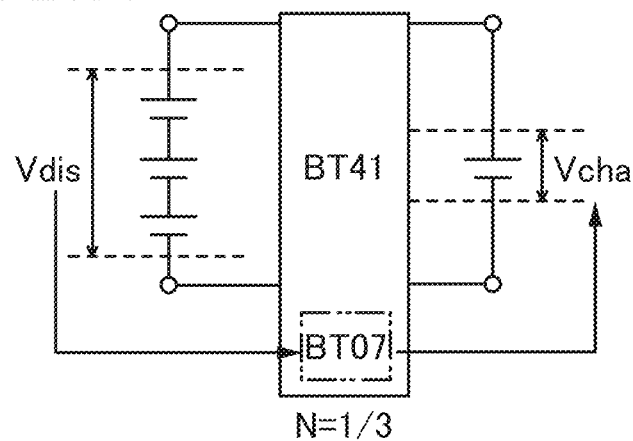
FIGS. 27A to 27C are conceptual diagrams each illustrating a battery management unit of a power storage device.
Figure 27B:
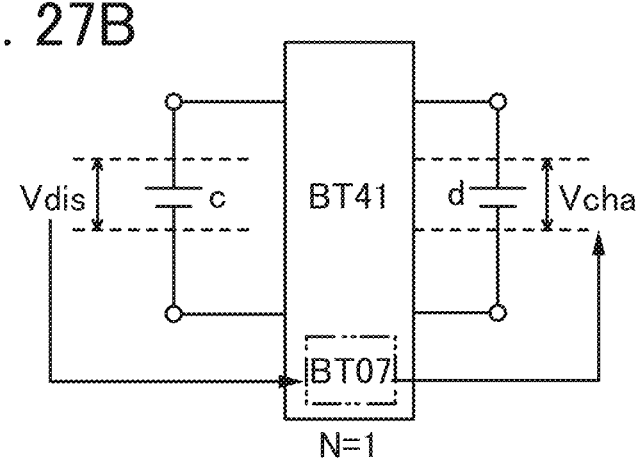
Figure 27C:
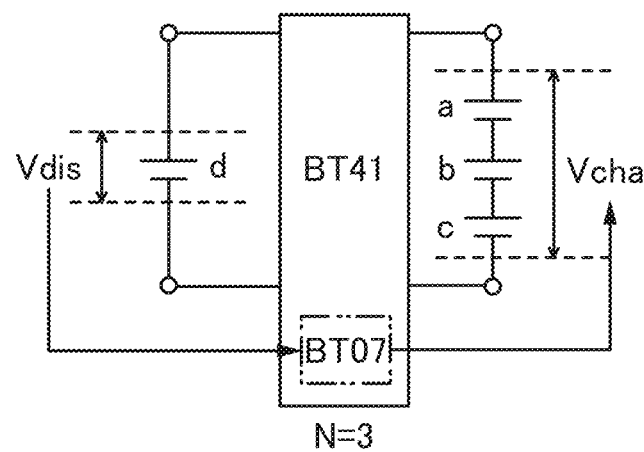

Here, operation examples of the voltage transformation control circuit BT06 in this embodiment will be described with reference to FIGS. 27A to 27C. FIGS. 27A to 27C are conceptual diagrams illustrating the operation examples of the voltage transformation control circuit BT06 for the discharge battery cell group and the charge battery cell group described in FIGS. 24A to 24C. FIGS. 27A to 27C each illustrate a battery management unit BT41. As described above, the battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In the example illustrated in FIG. 27A, the three consecutive high-voltage cells a to c and one low-voltage cell d are connected in series as described in FIG. 24A. In that case, as described using FIG. 24A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) on the basis of the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 27A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 27A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The transformer circuit BT07 applies the charging voltage which is transformed in response to the transformation signal S3 to the terminal pair BT02. Then, the battery cells BT09 included in the charge battery cell group are charged with the charging voltage applied to the terminal pair BT02.

In each of examples illustrated in FIGS. 27B and 27C, the conversion ratio N is calculated in a manner similar to that of FIG. 27A. In each of the examples illustrated in FIGS. 27B and 27C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 28:
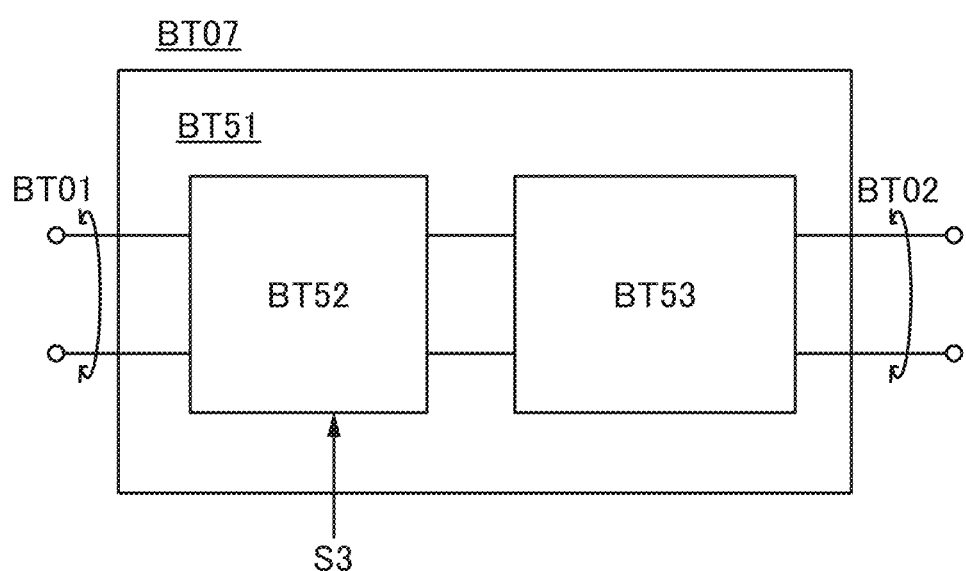
FIG. 28 is a block diagram illustrating a battery management unit of a power storage device.

The structure of the voltage transformer circuit BT07 including the insulated DC-DC converter is illustrated in FIG. 28. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 29:
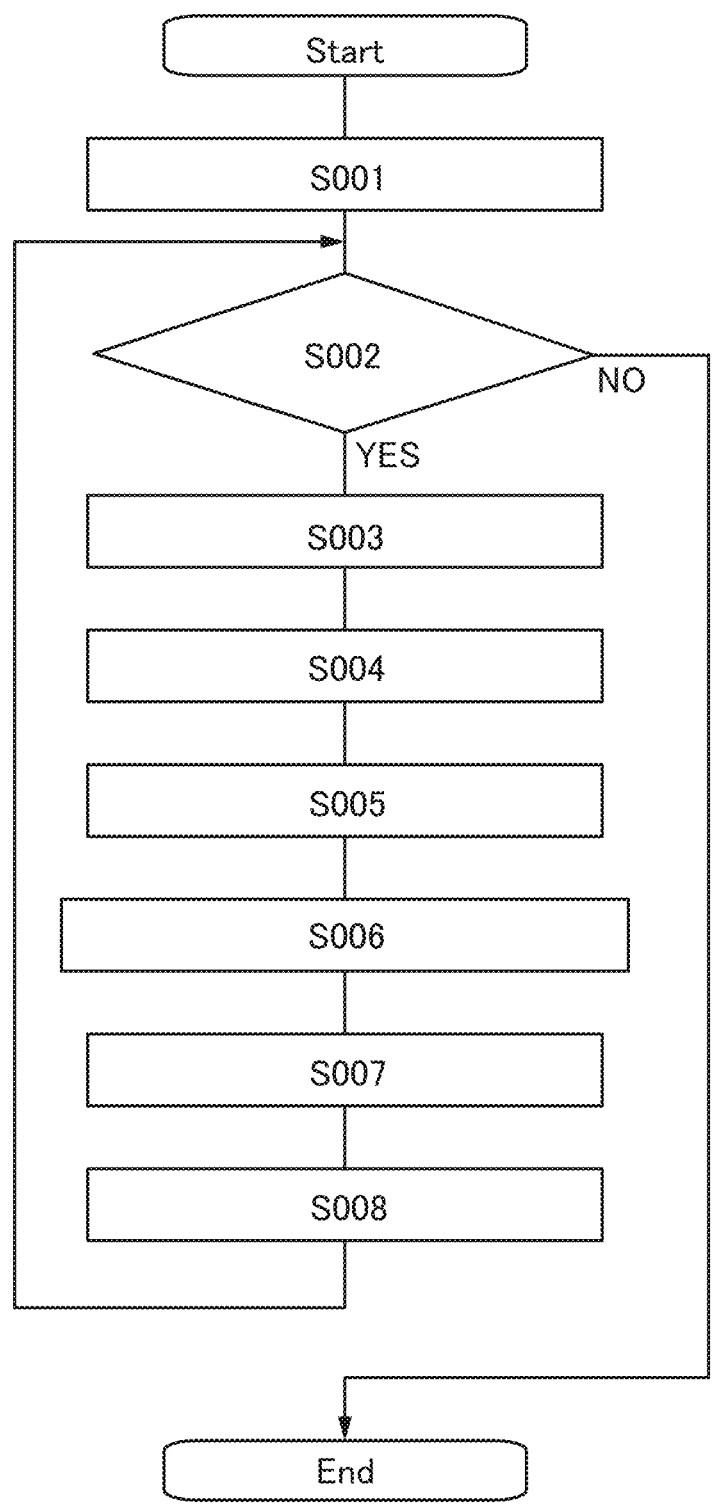
FIG. 29 is a flow chart illustrating a battery management unit of a power storage device.

A flow of operations of the power storage device BT00 in this embodiment will be described with reference to FIG. 29. FIG. 29 is a flow chart showing the flow of the operations of the power storage device BT00.

First, the power storage device BT00 obtains a voltage measured for each of the plurality of battery cells BT09 (step S001). Then, the power storage device BT00 determines whether or not the condition for starting the operation of reducing variations in voltage of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts, in response to the voltage transformation signal S3, the discharging voltage applied to the terminal pair BT01 into a charging voltage and applies the charging voltage to the terminal pair BT02 (step S008). In this way, charge of the discharge battery cell group is transferred to the charge battery cell group.

Although the plurality of steps is shown in order in the flow chart of FIG. 29, the order of performing the steps is not limited to the order.

With this embodiment, unlike in a capacitive type circuit, a structure for temporarily storing charge from the discharge battery cell group and then sending the stored charge to the charge battery cell group is unnecessary to transfer charge from the discharge battery cell group to the charge battery cell group. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in appropriate combination with any of the structures described in the other embodiments.

Embodiment 3

The power storage unit of one embodiment of the present invention can be used as a power storage device of various electronic devices which are driven by electric power. FIGS. 30A to 30G, FIGS. 31A to 31C, FIG. 32, and FIGS. 33A and 33B illustrate specific examples of the electronic devices using a power storage device of one embodiment of the present invention.

Specific examples of an electronic device including the power storage device of one embodiment of the present invention are as follows: display devices such as televisions and monitors, lighting devices, desktop personal computers, laptop personal computers, word processors, image reproduction devices which reproduce still images and moving images stored in recording media such as digital versatile discs (DVDs), portable CD players, radios, tape recorders, headphone stereos, stereos, table clocks, wall clocks, cordless phone handsets, transceivers, mobile phones, car phones, portable game machines, tablet terminals, large game machines such as pinball machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the power storage devices are also included in the category of electronic devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In addition, the power storage device of one embodiment of the present invention can be incorporated along a curved inside/outside wall surface of a house or a building or a curved interior/exterior surface of a car.

Figure 30A:
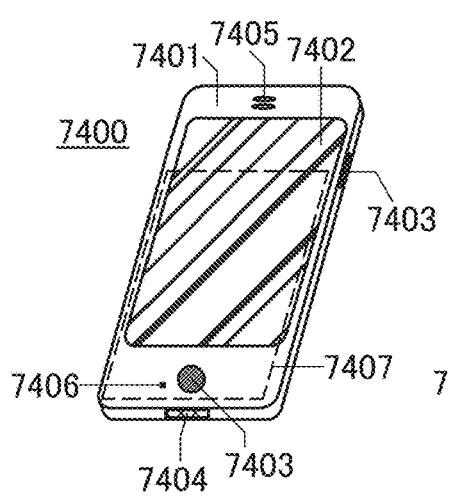
FIGS. 30A to 30G illustrate examples of an electronic device.

FIG. 30A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 30B:
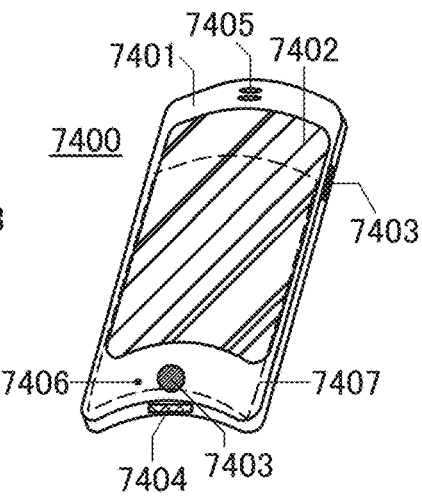
Figure 30C:
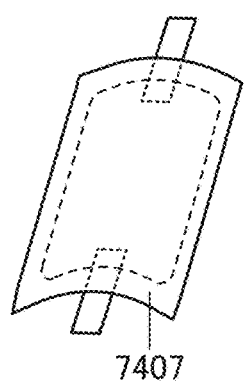

The mobile phone 7400 illustrated in FIG. 30B is bent. When the whole mobile phone 7400 is bent by the external force, the power storage device 7407 included in the mobile phone 7400 is also bent. FIG. 30C illustrates the bent power storage device 7407.

Figure 30D:
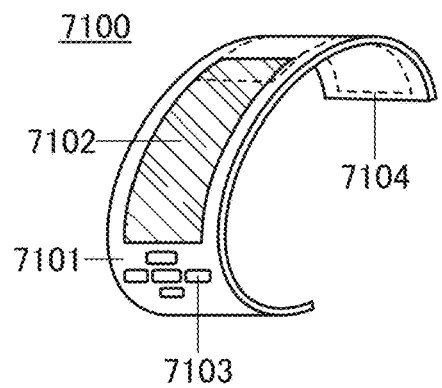
Figure 30E:
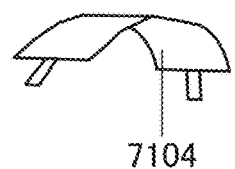

FIG. 30D illustrates an example of a bangle display device. A portable display device 7100 includes a housing 7101, a display portion 7102, an operation button 7103, and a power storage device 7104. FIG. 30E illustrates the bent power storage device 7104.

Figure 30F:
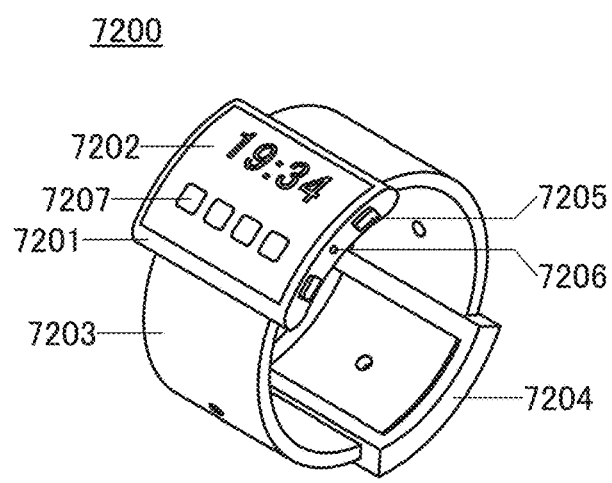

FIG. 30F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. Further, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

Further, the portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. Power charging through the input output terminal 7206 is possible. Note that the charging operation may be performed by wireless power feeding without using the input output terminal 7206.

The portable information terminal 7200 includes the power storage device of one embodiment of the present invention. For example, the power storage device 7104 illustrated in FIG. 30E that is in the state of being curved can be provided in the housing 7201. Alternatively, the power storage device 7104 illustrated in FIG. 30E can be provided in the band 7203 such that it can be curved.

Figure 30G:
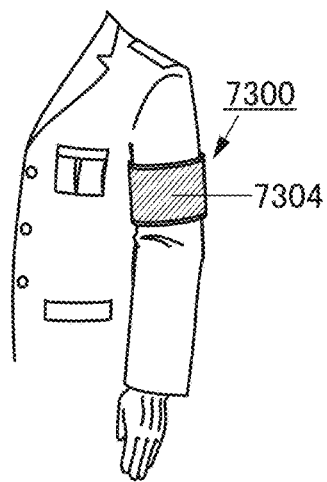

FIG. 30G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method in accordance with an existing communication standard.

The display device 7300 includes an input output terminal, and data can be directly transmitted to and received from another information terminal via a connector. Power charging through the input output terminal is possible. Note that the charging operation may be performed by wireless power feeding without using the input output terminal.

Figure 31A:
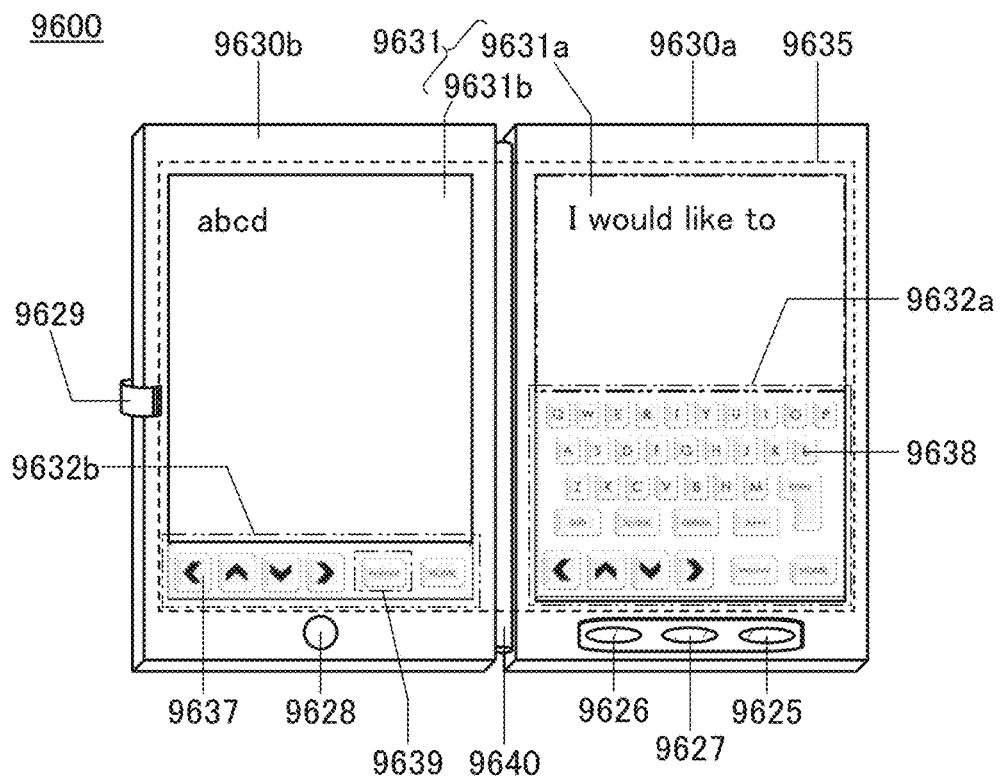
FIGS. 31A to 31C illustrate an example of an electronic device.
Figure 31B:
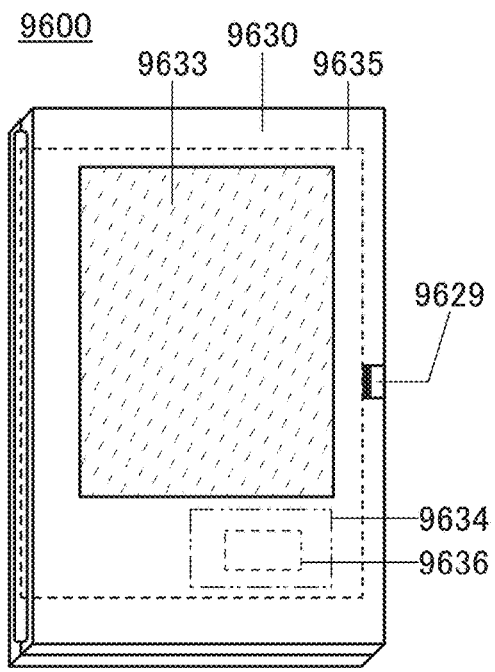

FIGS. 31A and 31B illustrate an example of a tablet terminal that can be folded in half. A tablet terminal 9600 illustrated in FIGS. 31A and 31B includes a housing 9630a, a housing 9630b, a movable portion 9640 connecting the housings 9630a and 9630b, a display portion 9631 including a display portion 9631a and a display portion 9631b, a switch 9626 for switching a display mode, a power switch 9627, a power saver switch 9625, a fastener 9629, and an operation switch 9628. FIGS. 31A and 31B illustrate the tablet terminal 9600 opened and closed, respectively.

The tablet terminal 9600 includes a power storage device 9635 inside the housings 9630a and 9630b. The power storage device 9635 is provided across the housings 9630a and 9630b, passing through the movable portion 9640.

Part of the display portion 9631a can be a touch panel region 9632a, and data can be input by touching operation keys 9638 that are displayed. Note that FIG. 31A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard button and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power saver switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same display area in FIG. 31A as an example, one embodiment of the present invention is not particularly limited to this example. The display portion 9631a and the display portion 9631b may have different areas or different display quality. For example, one of the display portions 9631a and 9631b may display higher definition images than the other.

The tablet terminal is closed in FIG. 31B. The tablet terminal includes the housing 9630, a solar cell 9633, and a charge and discharge control circuit 9634 including a DCDC converter 9636. The power storage unit of one embodiment of the present invention can be used for the power storage device 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the power storage device 9635 of one embodiment of the present invention has flexibility and can be repeatedly bent without a large decrease in charge and discharge capacity. Thus, a highly reliable tablet terminal can be provided.

The tablet terminal illustrated in FIGS. 31A and 31B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that a structure in which the solar cell 9633 is provided on one or both surfaces of the housing 9630 is preferable because the power storage device 9635 can be charged efficiently. The use of a lithium-ion battery as the power storage device 9635 brings an advantage such as a reduction in size.

Figure 31C:
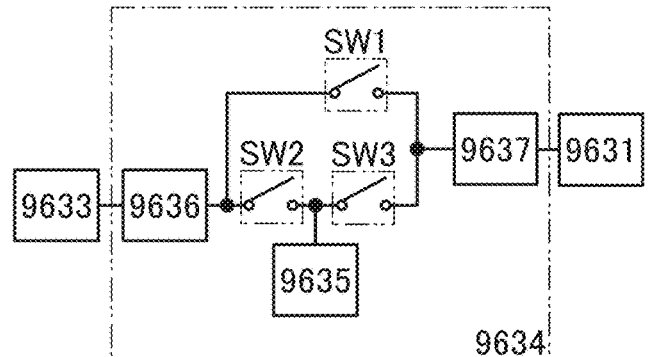

The structure and operation of the charge and discharge control circuit 9634 illustrated in FIG. 31B are described with reference to a block diagram of FIG. 31C. The solar cell 9633, the power storage device 9635, the DC-DC converter 9636, a converter 9637, switches SW1 to SW3, and the display portion 9631 are illustrated in FIG. 31C, and the power storage device 9635, the DC-DC converter 9636, the converter 9637, and the switches SW1 to SW3 correspond to the charge and discharge control circuit 9634 in FIG. 31B.

First, an example of operation in the case where electric power is generated by the solar cell 9633 using external light will be described. The voltage of electric power generated by the solar cell is raised or lowered by the DC-DC converter 9636 to a voltage for charging the power storage device 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage device 9635 can be charged.

Note that the solar cell 9633 is described as an example of a power generation means; however, one embodiment of the present invention is not limited to this example. The power storage device 9635 may be charged using another power generation means such as a piezoelectric element or a thermoelectric conversion element (Peltier element). For example, the power storage device 9635 may be charged with a non-contact power transmission module capable of performing charging by transmitting and receiving electric power wirelessly (without contact), or any of the other charge means used in combination.

Figure 32:
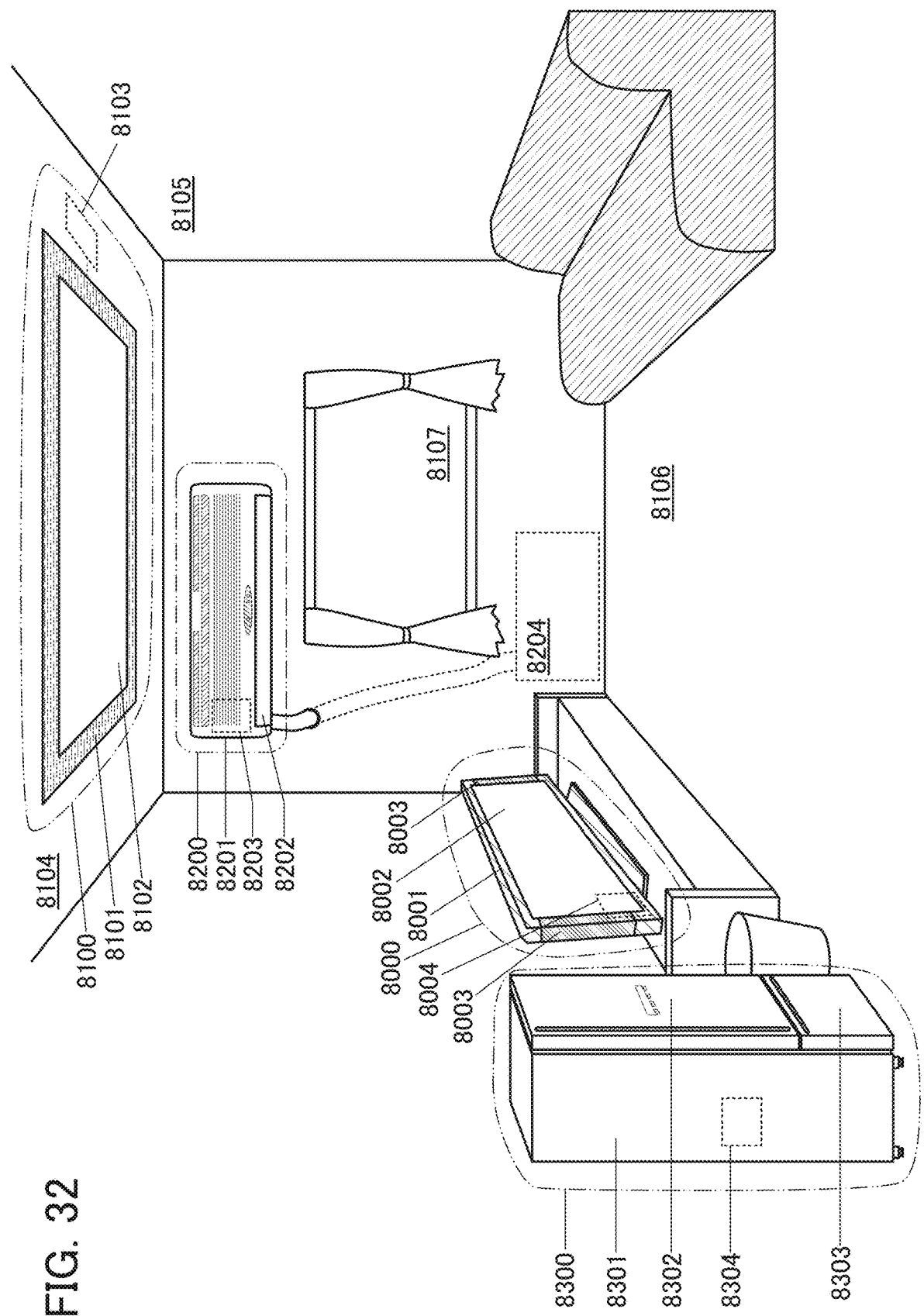
FIG. 32 illustrates examples of an electronic device.

FIG. 32 illustrates other examples of electronic devices. In FIG. 32, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 32, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 32 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 32 as an example, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 32, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 32 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 32 as an example, the power storage device of one embodiment of the present invention can be used in an air conditioner in which the functions of an indoor unit and an outdoor unit are integrated in one housing.

In FIG. 32, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 32. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

The use of a power storage device in vehicles can lead to next-generation clean energy vehicles such as hybrid electric vehicles (HEVs), electric vehicles (EVs), and plug-in hybrid electric vehicles (PHEVs).

Figure 33A:
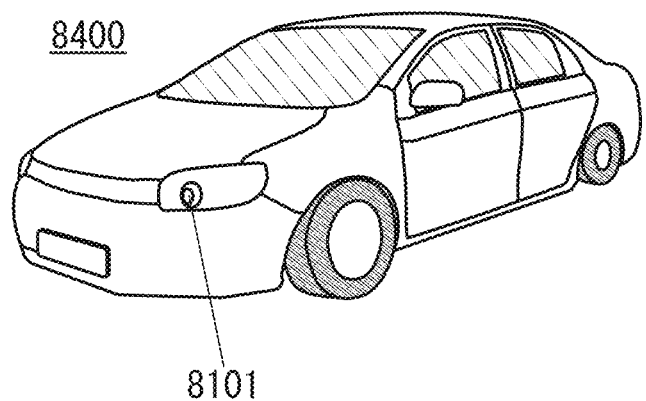
FIGS. 33A and 33B illustrate examples of a vehicle using one embodiment of the present invention.
Figure 33B:
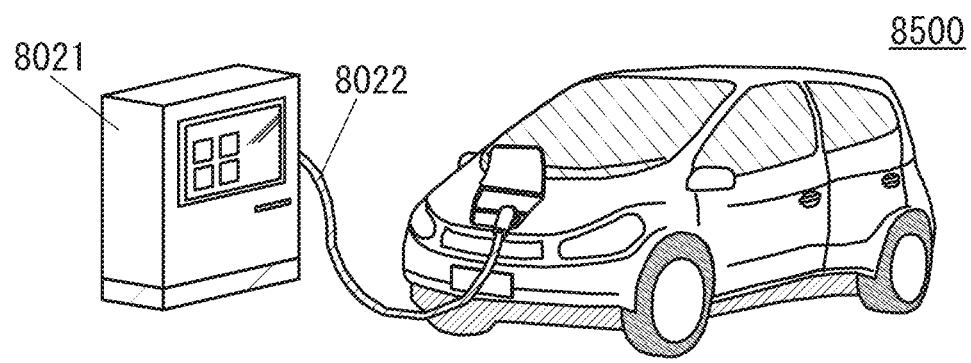

FIGS. 33A and 33B each illustrate an example of a vehicle using one embodiment of the present invention. An automobile 8400 illustrated in FIG. 33A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device included in the automobile 8400, such as a speedometer or a tachometer. Furthermore, the power storage device can supply electric power to a semiconductor device included in the automobile 8400, such as a navigation system.

FIG. 33B illustrates an automobile 8500 including a power storage device. The automobile 8500 can be charged when the power storage device is supplied with electric power through external charging equipment by a plug-in system, a contactless power feeding system, or the like. In FIG. 33B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. For example, with the use of a plug-in technique, a power storage device included in the automobile 8500 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Further, the power storage device included in the vehicle can be used as a power source for supplying electric power to products other than the vehicle. In such a case, the use of a commercial power source can be avoided at peak time of electric power demand.

This embodiment can be implemented in appropriate combination with any of the structures described in the other embodiments.

This application is based on Japanese Patent Application serial no. 2015-101318 filed with Japan Patent Office on May 18, 2015, the entire contents of which are hereby incorporated by reference.

What is claimed is:

1. A power storage unit comprising:
   an exterior body;
   a positive electrode;
   a negative electrode;
   a separator; and
   an electrolyte solution,
   wherein the positive electrode, the negative electrode, the separator, and the electrolyte solution are surrounded by the exterior body,
   wherein the exterior body has a projection whose ridgeline extends in a first direction and a depression whose valley line extend in a second direction, and
   wherein the ridgeline or an extended line of the ridgeline intersects with the valley line or an extended line of the valley line.

2. The power storage unit according to claim 1,
   wherein the ridgeline includes a region overlapping with the positive electrode, the negative electrode, and the separator.

3. The power storage unit according to claim 1,
   wherein the valley line includes a first region overlapping with the positive electrode, a second region overlapping with the negative electrode, and a third region overlapping with the separator.

4. The power storage unit according to claim 1,
   wherein the first direction is orthogonal to the second direction.

5. The power storage unit according to claim 1,
   wherein the exterior body is a stack including a metal film and a thermoplastic film.

6. An electronic device comprising the power storage unit according to claim 1.

7. An electronic device according to claim 6,
   wherein a shape of the power storage unit changes in accordance with a change in a shape of a housing of the electronic device.

8. A power storage unit comprising:
   an exterior body;
   a positive electrode;
   a negative electrode;
   a separator; and
   an electrolyte solution,
   wherein the positive electrode, the negative electrode, the separator, and the electrolyte solution are surrounded by the exterior body,
   wherein the exterior body comprises a first ridgeline and a first valley line each extending in a first direction, and a second ridgeline and a second valley line each extending in a second direction,
   wherein the first ridgeline or an extended line of the first ridgeline intersects with the second valley line or an extended line of the second valley line, and
   wherein the first valley line or an extended line of the first valley line intersects with the second ridgeline or an extended line of the second ridgeline.

9. The power storage unit according to claim 8,
   wherein the first ridgeline includes a first region overlapping with the positive electrode, the negative electrode, and the separator in the second direction, and
   wherein the first valley line includes a second region overlapping with the positive electrode, the negative electrode, and the separator in the second direction.

10. The power storage unit according to claim 8,
    wherein the second ridgeline includes a first region overlapping with the positive electrode, a second region overlapping with the negative electrode, and a third region overlapping with the separator, and
    wherein the second valley line includes a fourth region overlapping with the positive electrode, a fifth region overlapping with the negative electrode, and a sixth region overlapping with the separator.

11. The power storage unit according to claim 8,
    wherein the first direction is orthogonal to the second direction.

12. The power storage unit according to claim 8,
    wherein the exterior body is a stack including a metal film and a thermoplastic film.

13. An electronic device comprising the power storage unit according to claim 8.

14. An electronic device according to claim 13,
    wherein a shape of the power storage unit changes in accordance with a change in a shape of a housing of the electronic device.

15. A power storage unit comprising:
    an exterior body;
    a positive electrode;
    a negative electrode;
    a separator; and
    an electrolyte solution,
    wherein the positive electrode, the negative electrode, the separator, and the electrolyte solution are surrounded by the exterior body,
    wherein the exterior body comprises a first surface, a second surface, a third surface, and a fourth surface,
    wherein the first surface comprises a first ridgeline extending in a first direction,
    wherein the second surface comprises a first valley line extending in a second direction,
    wherein the third surface comprises a second ridgeline extending in a third direction,
    wherein the fourth surface comprises a second valley line extending in a fourth direction,
    wherein both of the first ridgeline or an extended line of the first ridgeline and the second ridgeline or an extended line of the second ridgeline line intersect with both of the first valley line or an extended line of the first valley line and the second valley line or an extended line of the second valley line.

16. The power storage unit according to claim 15,
    wherein the first ridgeline and the second ridgeline each comprise a region overlapping with the positive electrode, the negative electrode, and the separator.

17. The power storage unit according to claim 15,
    wherein the first valley line and the second valley line each comprise a first region overlapping with the positive electrode, a second region overlapping with the negative electrode, and a third region overlapping with the separator.

18. The power storage unit according to claim 15,
    wherein the first direction and the third direction are same.

19. The power storage unit according to claim 15,
    wherein the second direction and the fourth direction are same.

20. The power storage unit according to claim 15,
    wherein at least one of the first direction and the third direction is orthogonal to at least one of the second direction and the fourth direction.

21. The power storage unit according to claim 15,
    wherein the exterior body is a stack including a metal film and a thermoplastic film.

22. An electronic device comprising the power storage unit according to claim 15.

23. An electronic device according to claim 22, wherein a shape of the power storage unit changes in accordance with a change in a shape of a housing of the electronic device.

* * * * *